(12) United States Patent
Solomon

(10) Patent No.: US 8,730,129 B2
(45) Date of Patent: May 20, 2014

(54) ADVANCED IMMERSIVE VISUAL DISPLAY SYSTEM

(76) Inventor: Dennis J Solomon, Yarmouth Port, MA (US)

( * ) Notice: Subject to any disclaimer, the term of this patent is extended or adjusted under 35 U.S.C. 154(b) by 1250 days.

(21) Appl. No.: 12/456,401

(22) Filed: Jun. 15, 2009

(65) Prior Publication Data

US 2011/0007277 A1    Jan. 13, 2011

Related U.S. Application Data

(63) Continuation-in-part of application No. 11/149,638, filed on Jun. 9, 2005, now abandoned, which is a continuation-in-part of application No. 10/307,620, filed on Dec. 2, 2002, now abandoned, and a continuation-in-part of application No. 10/941,461, filed on Sep. 15, 2004, now abandoned, which is a continuation-in-part of application No. 10/172,629, filed on Jun. 14, 2002, now abandoned, which is a continuation-in-part of application No. 09/706,260, filed on Nov. 3, 2000, now abandoned, which is a continuation-in-part of application No. 08/074,398, filed on Jun. 10, 1993, now abandoned, said application No. 10/941,461 is a continuation-in-part of application No. 09/706,260, filed on Nov. 3, 2000, now abandoned, which is a continuation-in-part of application No. 08/074,398, filed on Jun. 10, 1993, now abandoned, which is a continuation-in-part of application No. 07/799,066, filed on Nov. 27, 1991, now Pat. No. 5,192,490.

(60) Provisional application No. 60/584,351, filed on Jun. 30, 2004.

(30) Foreign Application Priority Data

Dec. 7, 1990 (FR) ....................................... 9015462

(51) Int. Cl.
*G09G 5/00*   (2006.01)
(52) U.S. Cl.
USPC ................. 345/8; 345/87; 345/82; 345/32
(58) Field of Classification Search
USPC ............................................ 345/8, 87, 82, 32
See application file for complete search history.

(56) References Cited

U.S. PATENT DOCUMENTS

| | | | | |
|---|---|---|---|---|
| 5,355,181 | A * | 10/1994 | Ashizaki et al. | 348/744 |
| 5,914,807 | A * | 6/1999 | Downing | 359/326 |
| 6,064,423 | A * | 5/2000 | Geng | 348/36 |
| 6,628,248 | B2 * | 9/2003 | Masumoto et al. | 345/32 |
| 2003/0071813 | A1 * | 4/2003 | Chiabrera et al. | 345/426 |
| 2004/0196435 | A1 * | 10/2004 | Dick et al. | 351/222 |
| 2006/0284790 | A1 * | 12/2006 | Tegreene et al. | 345/7 |

FOREIGN PATENT DOCUMENTS

JP          07-333546       * 12/1995

* cited by examiner

*Primary Examiner* — William Boddie
*Assistant Examiner* — Leonid Shapiro

(57) ABSTRACT

The present invention discloses an improved method and device for the immersive display of three-dimensional images with visual accommodation. An improved method for manufacturing a visual display incorporating a scanned light source and an improved method of presenting visual information are disclosed. A complete, immersive display environment is also presented.

19 Claims, 59 Drawing Sheets

PRISMATIC

FIG. 36
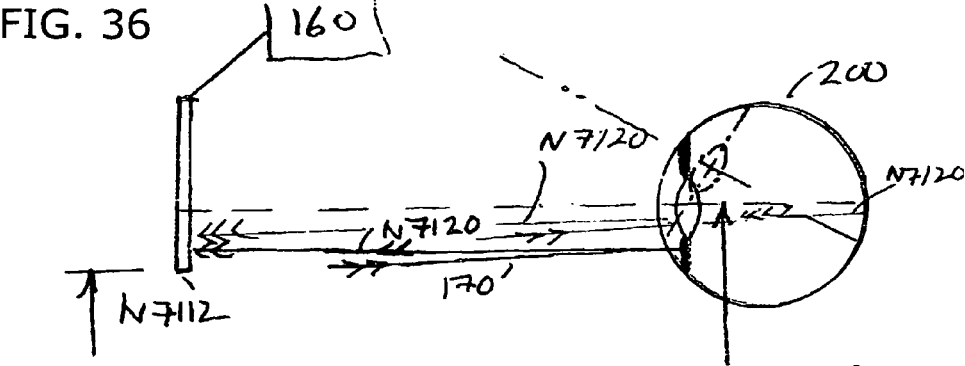
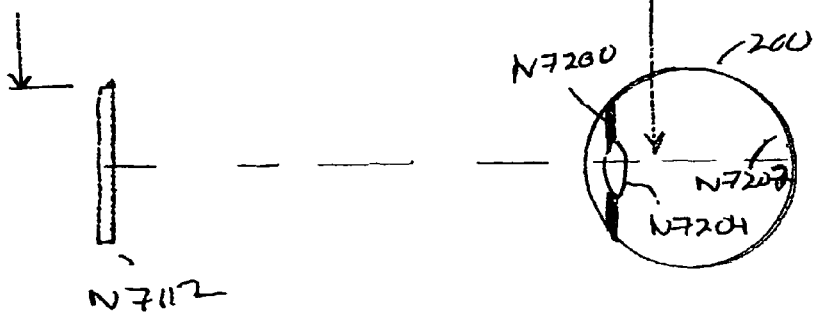

Fig. 45
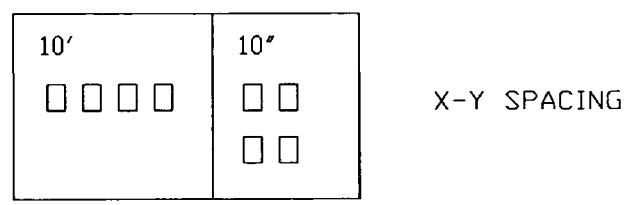
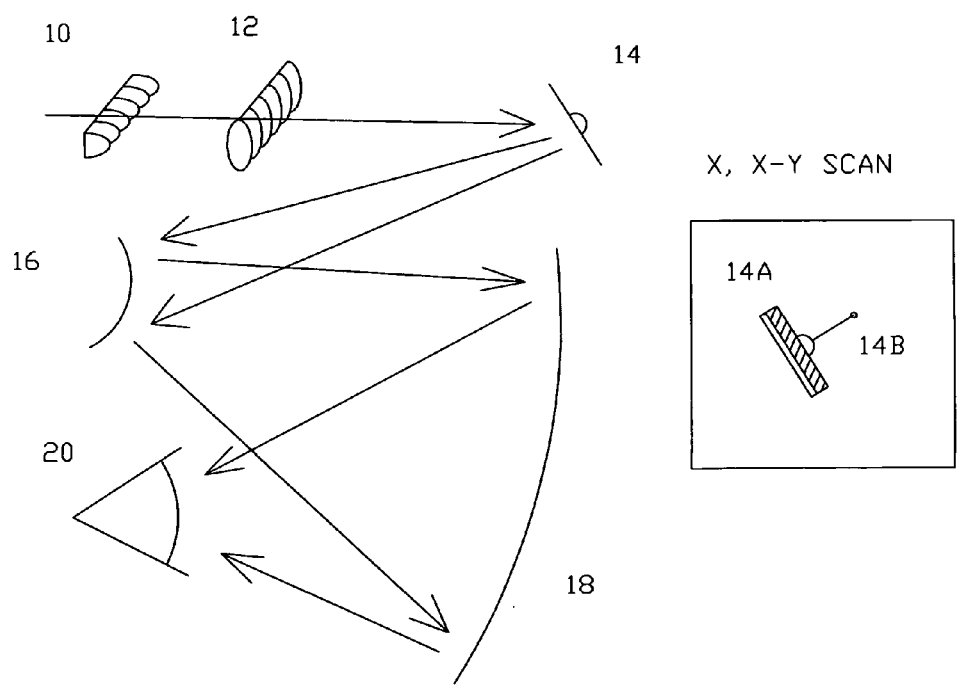

BINARY

CURRENT

OFFSET REFLECTOR

3000

3000

ADVANCED IMMERSIVE VISUAL DISPLAY SYSTEM

TECHNICAL FIELD

This invention relates generally to display devices and more particularly to 3D imaging displays devices having an optional variable visual image distance. This application incorporates by reference my related and earlier filed applications and disclosures, and claims the continuation-in-part benefit of Ser. No. 11/149,638, which is a CIP of Ser. No. 10/307,620; which is a CIP of Ser. Nos. 10/941,461 and 10/172,629; which are CIP of Ser. No. 09/706,260, which is a CIP of Ser. No. 08/074,398; which is a CIP of Ser. No. 07/799,066 and benefits from the non-provisional application 60/584,351.

BACKGROUND ART

Planar displays such as CRTs, LCD panels, laser scan and projection screens are well-known. These displays present an image at a fixed focal length from the audience. The appearance of three-dimensionality is a visual effect created by perspective, shading and occlusion and motion parallax. Integral photographic displays and lenticular autostereoscopic displays are also well-known, with a history that extends back at least 100 years. Miniature and head mounted displays (HMDs) are also well known and may involve a miniaturized version of the planar display technologies. In recent years, stereoscopic or 3D displays, which display a spatially distinct image to each eye, have enjoyed an increasing popularity for applications ranging from fighter pilot helmet displays to virtual reality games. The 3D HMD display technology has numerous extensions including Near-to-Eye (NTD)—periscopes and tank sights; Heads-Up (HUD)—windshield and augmented reality—and immersive displays (IMD)—including CAVE, dome and theater size environments. The principal employed varies little from that of the 1930 Polaroid™ glasses, or the barrier stereoscopic displays of the 1890s, despite. extensive invention related to the active technology to produce each display has occurred over the past twenty years. As applied to small displays, these techniques evolved from miniature cathode ray tubes to include miniature liquid crystal, field emission and other two-dimensional matrix displays, as well as variations of retinal scanning methodologies popularized by Reflection Technologies, Inc. of Cambridge, Mass. in the 1980s. Other approaches include scanning fiber optic point sources such as disclosed by Palmer, U.S. Pat. No. 4,234,788, compact folded, total internal reflection optical displays disclosed by Johnson in U.S. Pat. No. 4,109,263. These inventions have provided practical solutions to the problem of providing lightweight, high resolution displays but are limited to providing a stereoscopic view by means of image disparity. Visual accommodation is not employed. A solution to the problem of accommodation for all displays was disclosed by A. C. Traub in U.S. Pat. No. 3,493,390, Sher in U.S. Pat. No. 4,130,832, and others. These inventors proposed a modulated scanning signal beam coordinated with a resonantly varying focal length element disposed in the optical path between the image display and the observer.

It is well known in the field that wavefront-based technologies, which by definition are limited to coherent effects, impart significant specular and other aberrations degrading performance and inducing observer fatigue.

Alternative approaches where a data-controlled, variable focal length optical element was associated with each pixel of the display were such of experimentation by this inventor and others, including Sony Corporation researchers, in Cambridge, Mass. during the late 1980s. In 1990, Ashizaki, U.S. Pat. No. 5,355,181, of the Sony Corporation, disclosed an HMD with a variable focus optical system.

Despite the improvements during the past decade, the significant problem of providing a low cost, highly accurate visual display with full accommodation remains. One of the principal limitations has been the inability of sequentially resonant or programmed variable focal length optics combined with scanning configurations to properly display solid three dimensional pixels, orthogonal to the scanning plane. Another limitation is the inability of the observer's eye to properly and comfortably focus on rapidly flashing elements. Numerous inventions have been proposed which have generally been too complicated to be reliable, too expensive to manufacture, without sufficient resolution, accuracy, stability to gain wide acceptance. The present invention solves these problems, particularly related to the accurate display of solid and translucent 3D pixels.

BRIEF SUMMARY OF THE INVENTION

The present invention discloses an improved method and device for the display of a three dimensional image including stereoscopic and/or visual accommodation.

Another object of the present invention is an improved method and device for manufacturing a visual display incorporating a scanned light source, Another object of the present invention is an improved method and device which permits image 3D pixel sources to be arranged orthogonally to image plane thereby enabling the display of an undistorted orthogonal surface or translucent solid, Another object of the present invention is an improved method and device for constructing an accurate, augmented reality, visual display with automatic biocular alignment, Another object of the present invention is an improved method and device for constructing an accurate, augmented reality, visual display without an intermediate image plane, Another object of the present invention is an improved method and device for constructing an accurate, augmented reality, visual display where the principal scene object axis converge at a virtual point in a plane behind that describe by the lens of the eye.

Another object of the present invention is an improved method and device for manufacturing a visual display independent of coherence and wavefront curvature constraints, Another object of the present invention is an improved method and device for manufacturing a visual display where the principal virtual object image axes converge in a plane behind that described by the lenses of the eye's of the observers, Another object of the present invention is an improved method of presenting visual information, Another object of the present invention is an improved method and device to present visual information in compact form unaffected by an external environment,

BRIEF DESCRIPTION OF THE DRAWINGS

The above and still further objects, features and advantages of the present invention will become apparent upon consideration of the following detailed disclosure of specific embodiments of the invention, especially when taken in conjunction with the accompanying drawings, wherein:

FIG. 36 shows a perspective view of the virtual convergence points of the principal axis of the scene objects behind the plane of the lens of the eye in the present invention.

FIG. 45-58 presents a preferred waveguide embodiment of the present invention

DETAILED DESCRIPTION OF THE INVENTION

The general inventive concept in this application relates to improved methods and constructions to achieve a complex visual display environment which includes dynamic and precise focal length for each pixel of each frame of a visual display and the ability to present comfortable, three-dimensional image, virtual or augmented, to a single or multiple observers. This goal is ongoing quest for visual display engineers which has not been successfully addressed by the singular, or global methodologies of the prior art.

The present application discloses related inventive embodiments which lends themselves to incorporation in an array, including a preferred embodiment where the 2D array—which in the prior art would be orthogonal to the principal optical axis presenting the horizontal and vertical (X-Y) pixels—is turned approximately 90 degrees about the vertical axis (Y-Z) and aligned generally co-axially with the principal optical axis. In this embodiment, the array presents the vertical and focal depth pixels.

Figure 32:
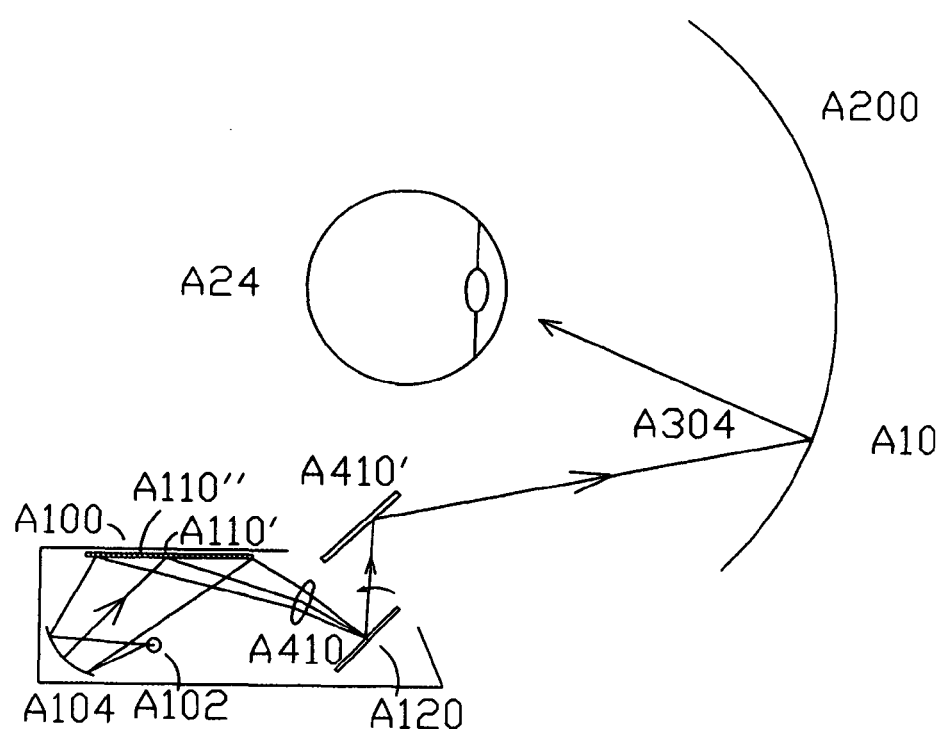
FIG. 32 shows a perspective view of a two photon activation embodiment of the present invention.

FIG. 32 affords an introduction to the preferred embodiment of independent claim 1 where the reflective SLM array A100 is turned generally co-axially with the principal axis, and pixels A110', A110" are a different (Z) distances from the imaging optics, representing generally the image object's distance from the viewer in the actual scene. The observer A24 will accommodate (focus) each pixel at a different distance.

The full volume image is created by optically scanning the array A100 through the observer's visual 'field of view'.

The 'computational means' refers to the Z-dimension pixel corresponding to the array A100 Z-dimension pixel.

The present invention does not require that the pixels or light sources be transparent, or that any light is actually transmitted through them. In this way, the present invention may be differentiated from orthogonally-layered approaches.

This approach has many technological, performance and manufacturing advantages including the ability to present discrete, collinear pixels of different focal distances with improved acuity within the period of visual integration.

Certain components of the present invention are common to most of the embodiments presented and are referred to by acronyms as follows:

A LEE (light emitting element) or "LEE array" refers to a matrix of LEDs (light emitting diodes), OLED, PLD, LCD (liquid crystal display), plasma elements, film projector or other means of projecting an array of image pixels. A LEE array may be linear, planar, a curved surface or other array in space. A linear array is commonly used throughout for convenience, but in most cases may be substituted by an other form.

A TIM (transduced-interlaced-means) refers to a means to direct the output of a LEE to a subset array of a full view. A TIM should not obscure the subsets. Examples include a microlens array, an optical funnel array including waveguides and fiber optics, a reflective mask, a diffraction array, holographic optical element or other known approach. The optical components may be physically or optical transduced by electro-optic, acoustic, piezo-optic, SLMs or other known means. Examples include, but are not limited to, mechanical piezo-actuators such as manufactured by Piezo Systems, Inc., acousto-optic beam direction modulators manufactured by Neos, Inc., liquid crystal variable diffractors manufactured by Dupont or active reflector pixels manufactured by Texas Instruments.

An FDOE (focal distance optical element) refers to a means for controlling the observed focal distance of the image or image pixel. The absence of this optical effect in many stereo systems induces a perceptual anomaly where the visual convergence and accommodation are in conflict. Auto-stereoscopic devices are known to have employed variable curvature reflectors, rotating asymmetric lenses, electronically or acoustically controlled optical materials, holographic optical elements and other technologies to achieve full frame focal distance control. These may be employed in the present invention. For individual point focus, it is important that the surrounding environment be unfilled or neutral to the point of attention. Thus the eye will find the best focus and rest at the corresponding distance. This effect may be imparted by means of a surrounding mask, interlacing, or image control.

Figure 1:
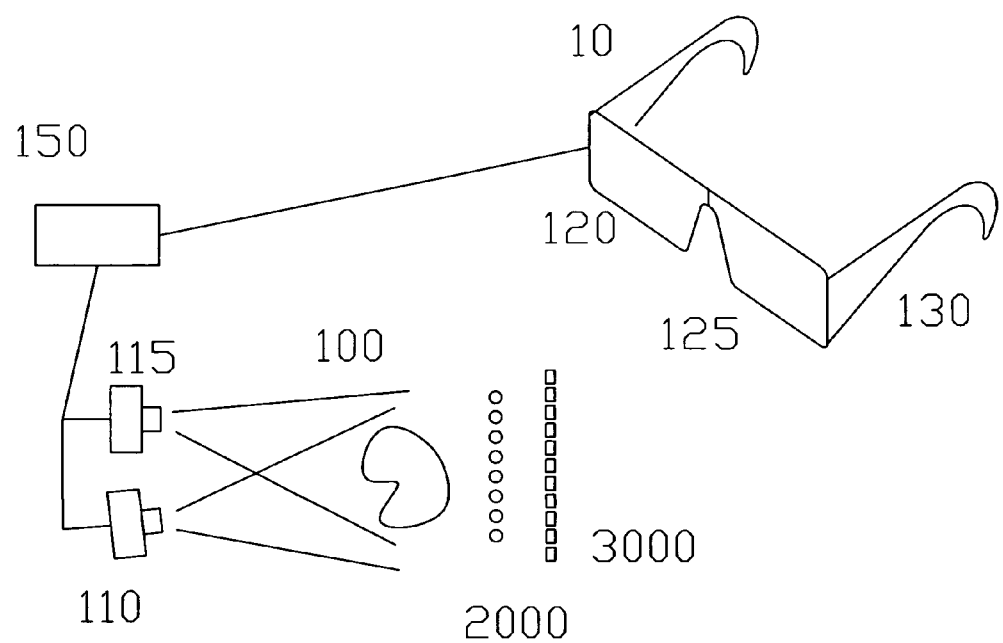
FIG. 1 presents a general view of binocular stereoscopic viewers.

Referring to FIG. 1, a stereo viewing system 10 generally presents the image of an object 100 taken by two cameras 110 and 115, displaced by a small distance equivalent to the separation of a viewer's eyes, to tv-type viewer panels 120 and 125, which corresponds to the view that would be seen by each eye. Commonly, the viewer panels 120 and 125 are mounted on an eyeglass or goggle-type frame 130. Alternatively, the images are presented combined on a single screen which is modulated in time, color or polarization by techniques well known. A stereo viewing system also commonly includes a link 140 between the cameras 110 and 115 and a processing computer, and a link 150 to the viewer panels 120 and 125. These links are often electronic, fiber optic, radiofrequency, microwave, infrared or other known method. The system does not have to be directly connected and storage media such as optical disks, film, digital tape, etc. may be used. Additionally, movable controlled device 2000 and a beam holographic background 3000 may be included in a complex visual display environment.

Figure 2:
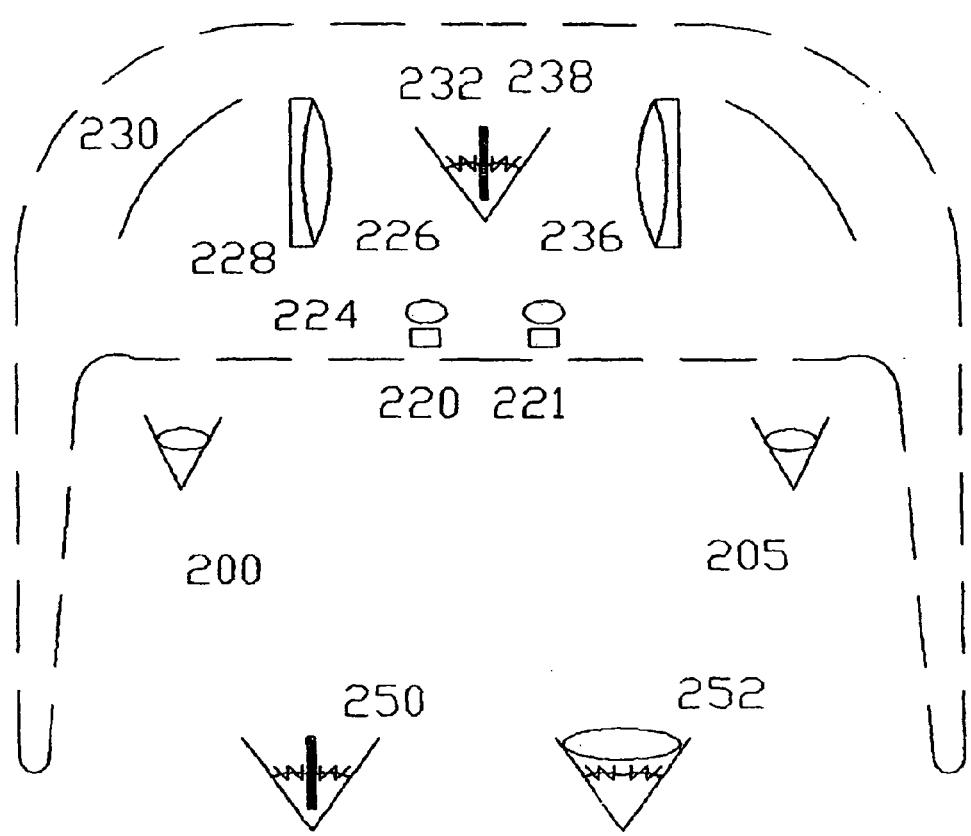
FIG. 2 presents a cross-sectional view of a stereo viewer.

FIG. 2 presents a top component view of a preferred goggle-type embodiment of the present invention. Only one side of the embodiment will be described with the understanding that the opposite side is a mirror image. The viewer's eyes are represented by icons 200 and 205, left and right, respectively. The outline of the goggle is represented by dashed line 210. The visible image is produced by viewing the light output of the light-emitting element array (LEE) 220 and 221 through first optical component 224, reflected off of translocation mirror 226, through second optical component 228, reflected off of reflective surface 230, and viewed by left eye 200. The LEE 220 may be placed in or above the plane of the eyes, proximally or distally to the nose. The other components of the optical path are adjusted accordingly. The reflective surface 230 may be a white screen surface or more efficiently, a mirrored surface, either continuous or of micro domains with binary, diffractive, microcast or other elements, having a generally elliptical focal shape such that the image of the LEE 220 is projected to the eye 200 of the observer. In such a precise system, an adjustment of the eye position would be incorporated in the design. An optional optical eyepiece 240 may be introduced to enhance certain domains. An elliptically (circularly) polarized window 242 with anti-reflection coating may form the exit aperture thus reducing the spurious reflections caused by external ambient light. This technique may be applied to all of the following embodiments. In operation, a complete image is created by the translocation of mirror 226 cyclically at rates in excess of image rate of 30 Hz while presenting successive sections of the image on LEE 220.

The components may be employed a variety of structures well known. The LEE 220 may be a linear, planar, offset, spaced or curved surface matrix of LEDs, LCD, plasma, ELL, CRT, or known method of producing an image. The optical component 224 may be made from plastic, glass or other optical material. The optical properties may be imparted by classical lens designs, prisms, fresnel, HOE (holographic optical elements), or other known technologies. Active optical elements such as electro- (including but not limited to LCD, FLCD, deformable surface tension), acoustic, optical or piezo-optical components may also be employed.

The translocation mirror 226 may be driven by a voice-coil type driver 232. Overall system balance of inertia and momentum may be accomplish by an equal and opposite driver 234 acting simultaneously on mirror 236 for the opposite eye 205. Both drivers 232 and 234 may be connected to a base 238 to provide stable and absolute registration. Other driver systems may be employed including piezo-mechanical actuators 250, rotary cams 252, variable pressure and other known systems.

Figure 3:
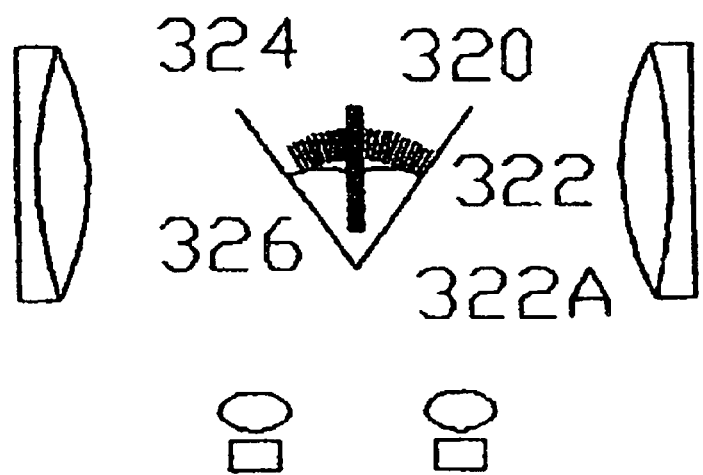
FIG. 3 presents a cross-sectional view of an encoded driver.

Referring to FIG. 3, the absolute registration of the images presented in the stereo viewer may be accomplished by employing an absolute or incremental encoder mechanism 310 such as an IR beam, proximity sensor, etc., monitoring the translocation mirror 326. One embodiment of the this method mounts the encoder beam and reading element 320 on a central base, the encoder lines 322 are fixed relative to the encoder element 320. A reflector 324 (not shown) directs the encoder beam to and from the translocation mirror 326. Alternatives include placing the encoder lines 322a on the mirror 326 which are read by an encoder mounted to intersect the transplanted path. Other systems include the use of interference fringes produced by coherent beam interactions or HOE elements. These systems are employed in other positioning systems.

Figure 4:
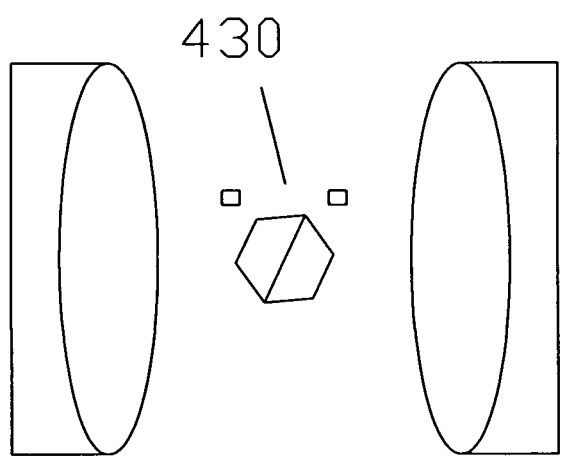
FIG. 4 presents a cross-sectional view of a rotating mirror embodiment.

Another preferred embodiment employing a rotating mirror and waveguide image plate is presented in FIG. 4. This method creates a visible image on the eye-side 410 of a waveguide/microlens plate 412 of the LEES 420 and 422. The components are one or more LEES 420 and 422, one or more focusing optical elements 424 and 426, a rotating reflector 430 of one or more reflective surfaces, a position encoder 432 related to the rotating reflector 430, a waveguide/microlens array 412, image optic elements 440, an image reflector 450. The viewer's eyes are represented by icon 460 and 462. The rotating reflector 430 may incorporate different displacement domains by means of micro optic regions, HOE, wedge or other known means, to increase the effective LEE 420 resolution and efficiency, In operation, a section of the full view is illuminated by LEE 420. The image of LEE 420 is focused by optical elements 424 and reflected by rotating reflector 430 onto the entrance apertures of waveguide 412. The image of LEE 420 exits on surface 410 and is viewed by eye 460 through reflector 450 and optical elements 440. The rotating reflector moves one increment which is encoded by encoder 432 and initiates the presentation of the next corresponding section of the full view on LEE 420. In a stereo system with a double-sided rotating reflector 430, LEE 422 may simultaneously present a corresponding section of the view to the opposite eye 462. As the rotating reflector 430 rotates, sections are presented to alternating eyes. All rotating scanning embodiments may incorporate a HOE, binary optic or other optic element on one of more faces of the scanning face, the rotating mirror 426, such that the image of the LEE 420 is displaced coaxially relative to the other faces. This approach functions as a transducing system to increase the resolution from a given LEE array. It may also be understood that the LEE array may include one or more columns positioned adjacent to LEE 420. An optional mask and transducer 470 may be affixed to the LEE 420.

Not shown but well understood by those skilled in the art are the computer control electronics, memory, and driver circuitry needed to interface the rotating mirror, encoder, and LEES.

Figure 5:
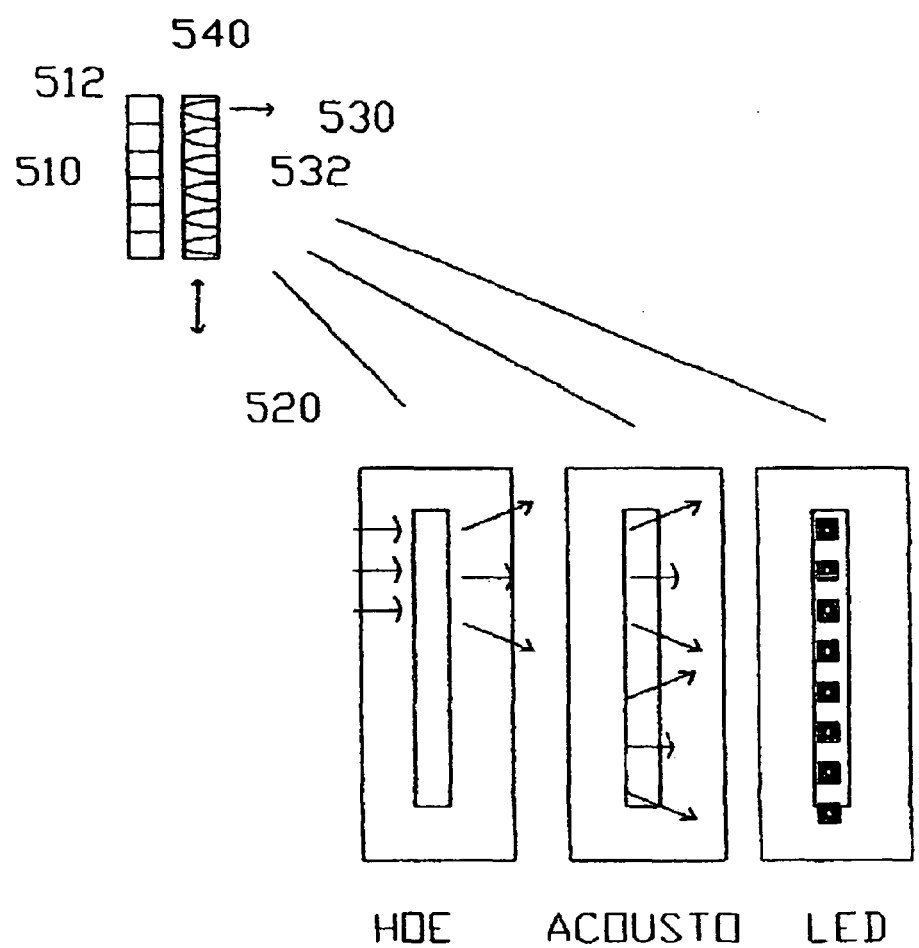
FIG. 5 presents a cross-sectional view of an interlaced array.

FIG. 5 presents the general concept of a transduced interlacing means. In operation, the output of the LEE array 510 traverses the TIM 530 and is masked or redirected. The output from single LEE element 512 is funneled by optical funnel TIM 532 into a narrower beam. When the TIM 530 is transduced or translocated by transducer 540, the single LEE element 512 will produce a series of discrete output beams. By coordinating the LEE output with the TIM transduction, a higher visual resolution may be achieved than from the LEE array alone.

Figure 6:
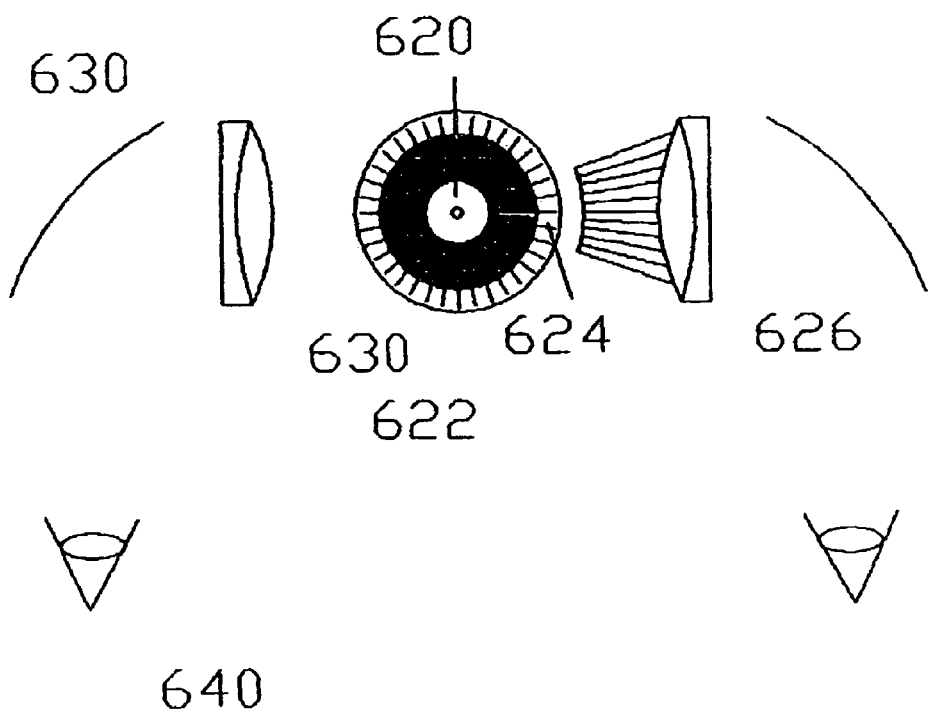
FIG. 6 presents a cross-sectional view of a cylindrical embodiment.

FIG. 6 presents another embodiment of a rotating optical element stereo view. This embodiment employs a rotating slit, pattern or waveguide port 624 to transfer the section of a full view to the viewer's eye. The port 624 may include optical elements to focus or transfer the beam. The components employed are a central LEE 620 which may be constructed as a vertical post of horizontal LEDs, or other light emitting elements, a rotating cylinder 622 which surrounds the LEE 620, an exit port 624 which presents the LEE 620, an optical element 626 with an optional waveguide array, an encoder 630 related to the rotating cylinder 622 and a reflector 630. The viewer's eye is represent by icon 640.

In operation, the central LEE 620 presents a section of the full view which is projected to the viewer's eye 640 by exiting the port 624 of the rotating cylinder 622, traversing the optical elements 626 which flatten the field and focus the LEE 620 or the port 624 image, and reflected by reflector 630. While synchronizing circuitry may be limited to a single encoded reference and speed control, a full absolute or incremental encoder may be affixed to the rotating cylinder 622. Successive sections of the full view are incrementally presented on the LEE 620 as the rotating cylinder 622.

Figure 7:
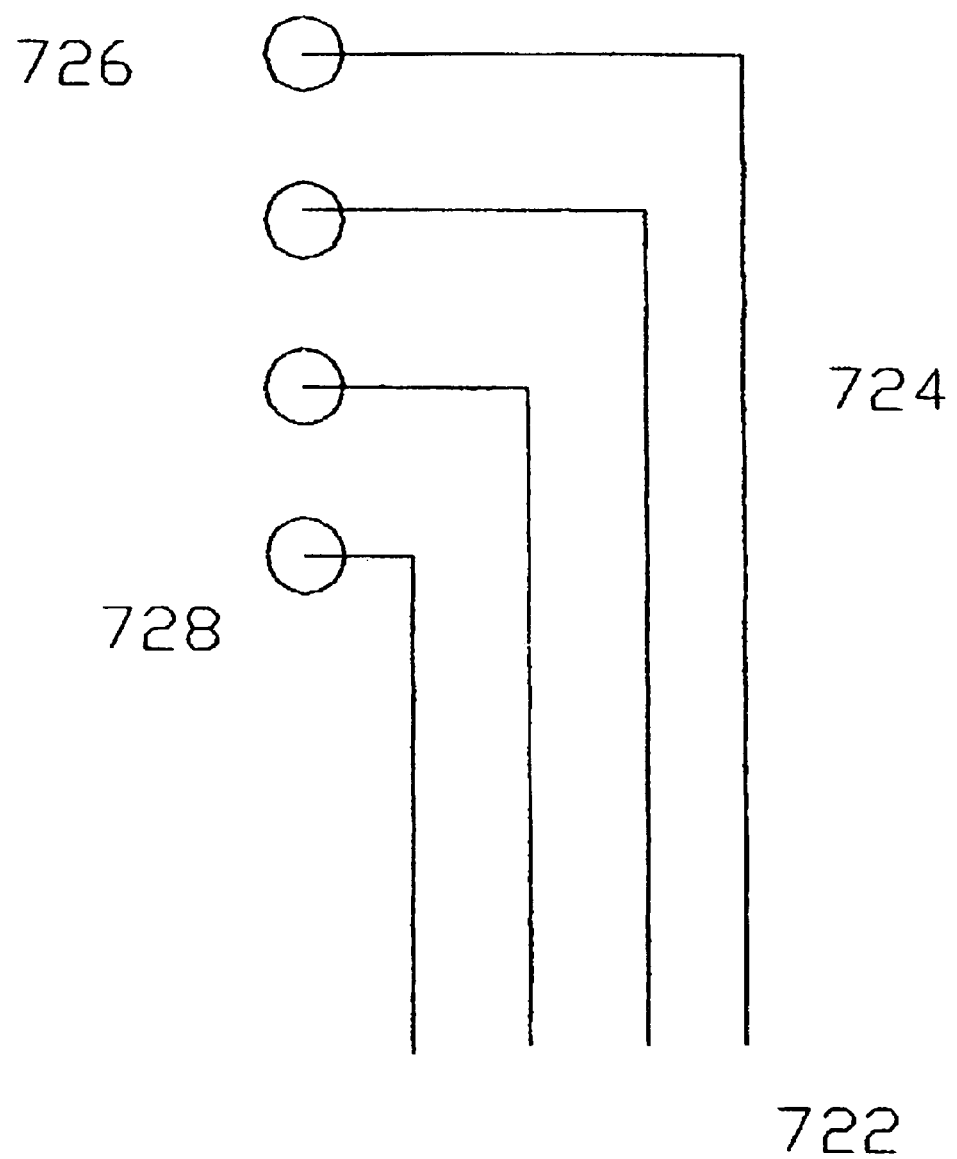
FIG. 7 presents a cross-sectional view of a light emitting element (LEE) array.

FIG. 7 presents an alternative embodiment of the LEE 622. A horizontal array 722 of LEDs or other light emitting elements is formed in a vertical post 726 by a series of optical waveguides 724. The output 728 of each waveguide may subtend a limited solid angle or be essentially circumferential. In a single port system of FIG. 6, a broad circumferential output 728 would be simple. In a multiple port system, a multiple number of arrays 722 may be utilized with corresponding waveguides and optics. The advantages of multiple systems include high resolutions, slower translocation speeds, and less critical optical tolerances.

Figure 8:
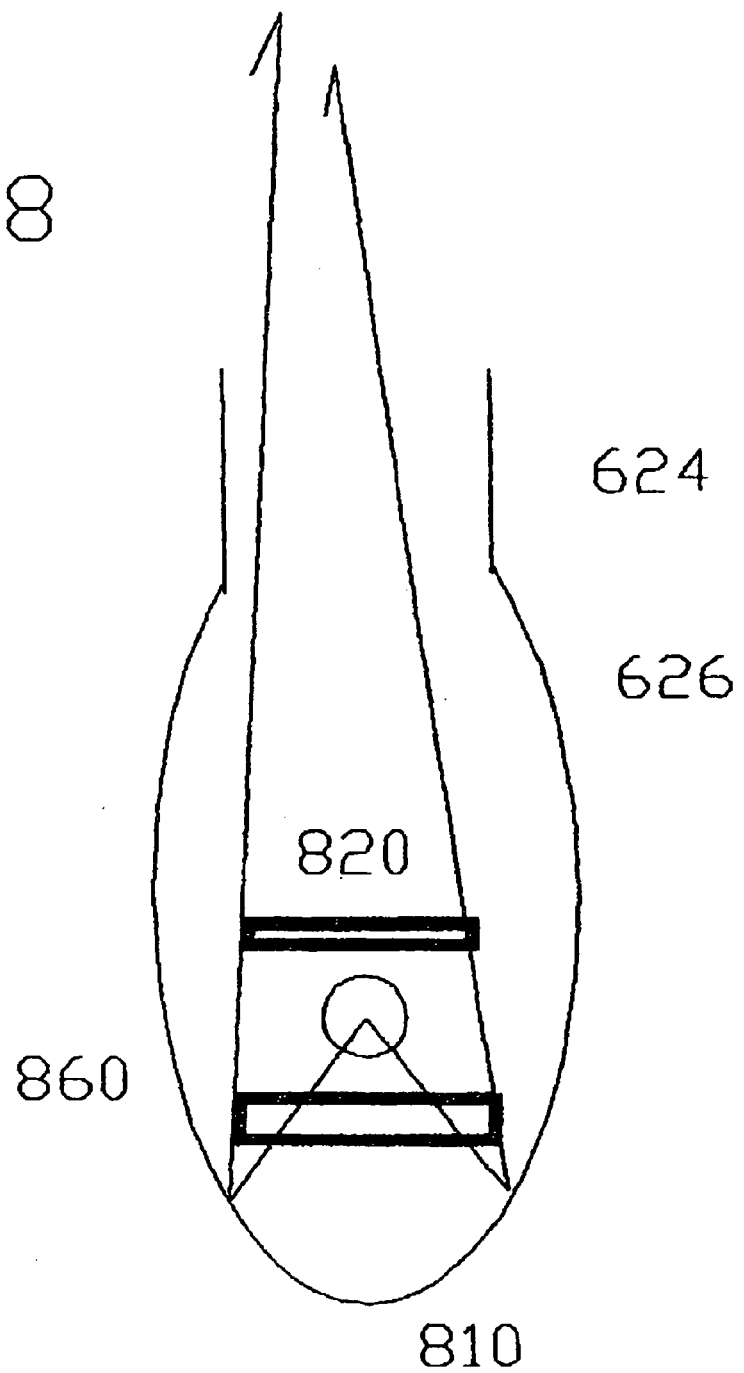
FIG. 8 presents a cross-sectional view of a reflecting chamber.

FIG. 8 presents a top view of a cross section of the interior of the rotating cylinder 622 of FIG. 6. The rotating cylinder 622 is constructed with an interior reflective inner cavity 810 which directs the output of stationary LEE 820 to the exit port 624. The output of LEE 820 in a simple construction may be broadly circumferential or focused to transverse optical lens element 860. Lens element 860 may be fixed or variable to direct and focus the output of LEE 820.

Figure 9:
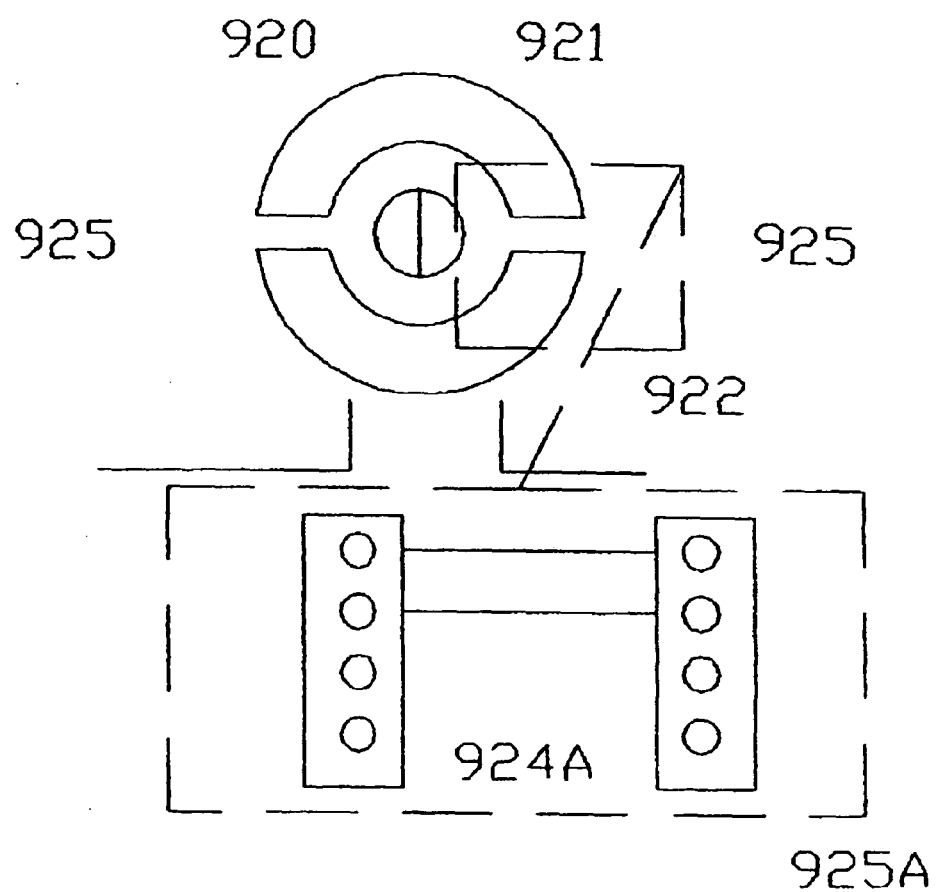
FIG. 9 presents a cross-sectional view of a multiple LEE arrays.

FIG. 9 present a top view of a cross section of the rotating cylinder of an embodiment of the present invention employing multiple LEE arrays. Rotating cylinder 922 shows two exit ports 924 and 925 and two opposite facing LEE arrays 920 and 921. In multiple port operation, the successive frames to one stereo view may be first presented by one port and then by the other. Thus, a full view is updated twice in one revolution of the cylinder. Alternatively, the exit port may contain apertures 924a with intervening dark spaces which correspond to the apertures of the opposite exit port 925a. This permits interlaced images from the same LEE array.

Figure 10:
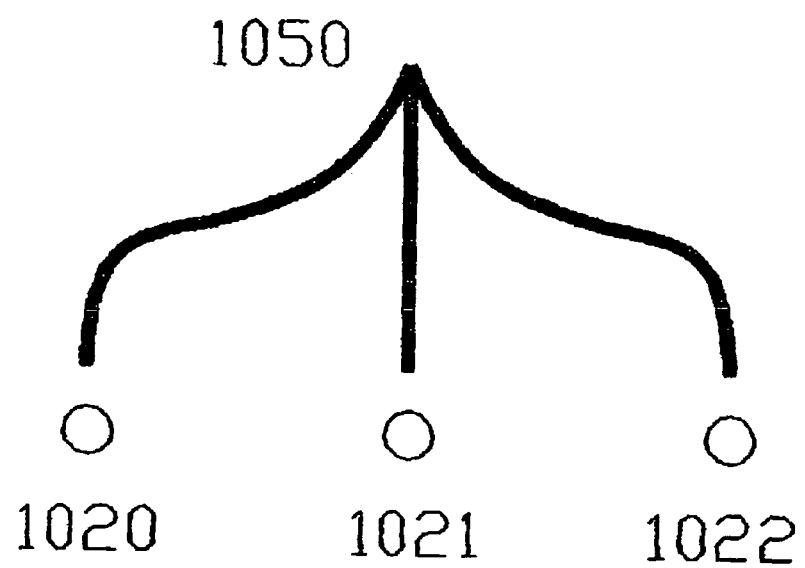
FIG. 10 presents a cross-sectional view of a tricolor waveguides.

FIG. 10. presents a waveguide method of combining three primary or other colored LEE 1020, 1021, 1022 into an optical waveguide 1050 to produce a full color image.

Figure 11:
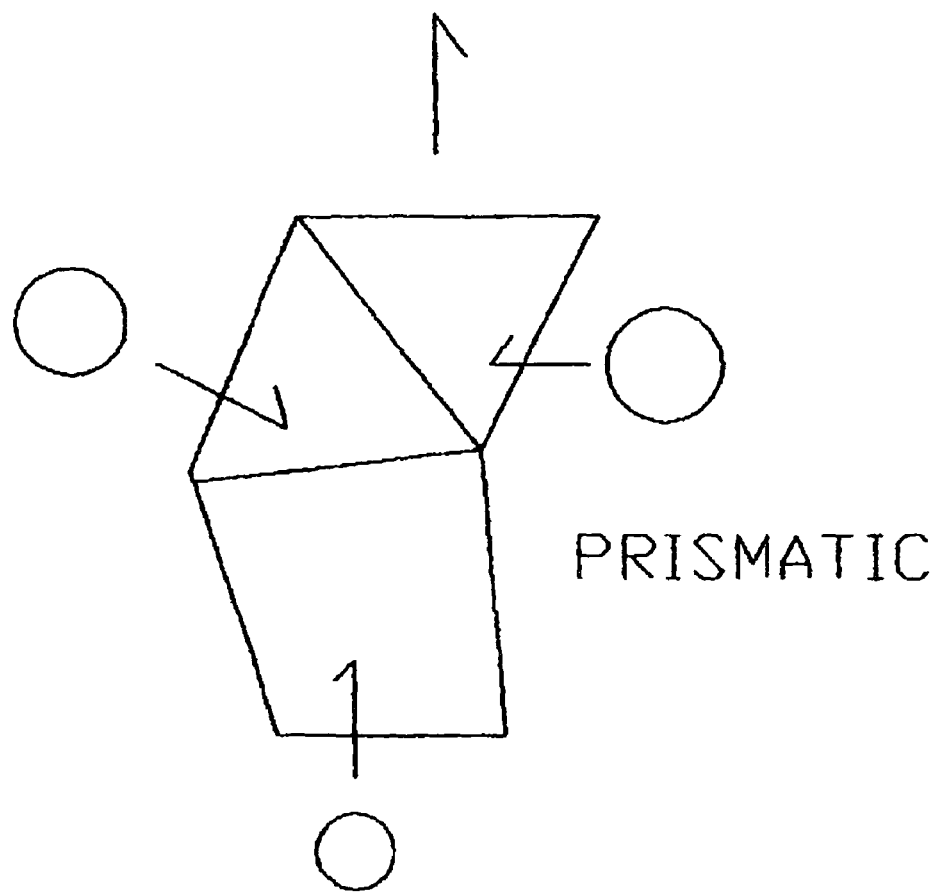
FIG. 11 presents a cross-sectional view of a prismatic color system.

FIG. 11 presents a prismatic method of combining three primary or other colored LES 1020, 1021, 1022 into a series of prisms 1150 to produce a full color image. Similar systems are employed by television and other cameras and projectors.

Figure 12:
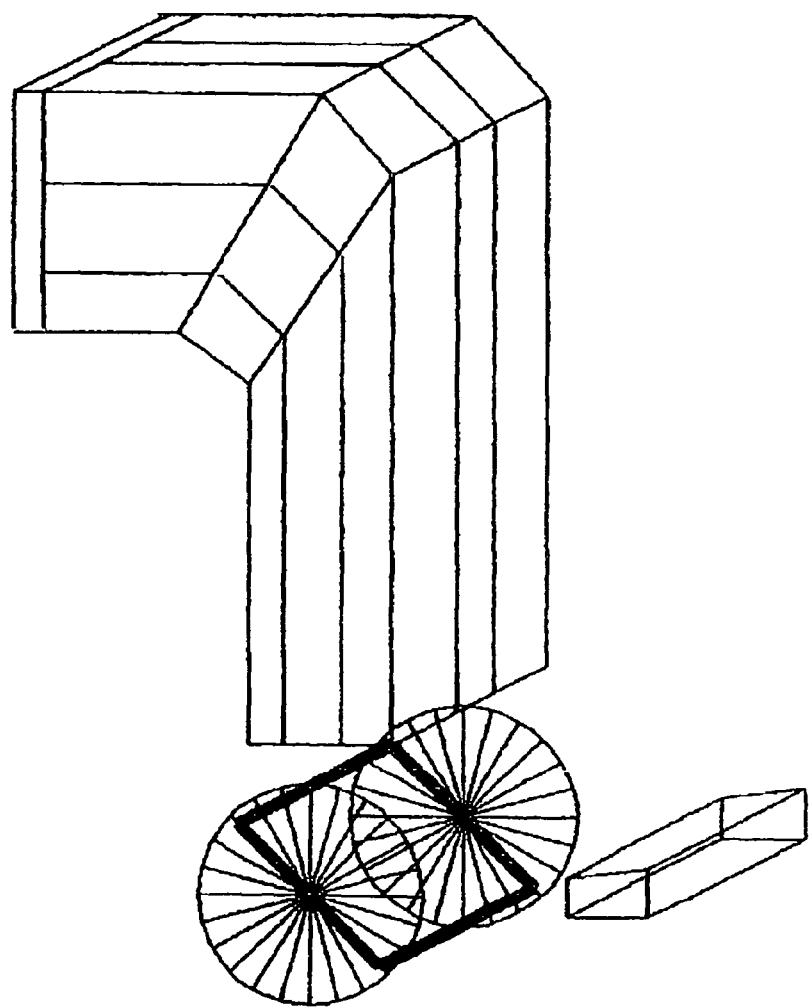
FIG. 12 presents a cross-sectional view of a thin waveguide screen.

FIG. 12 presents the scanner/encoder method for a waveguide type screen display. This system may be employed for stereoviewers in the form of goggles, screens, or projections.

Figure 13:
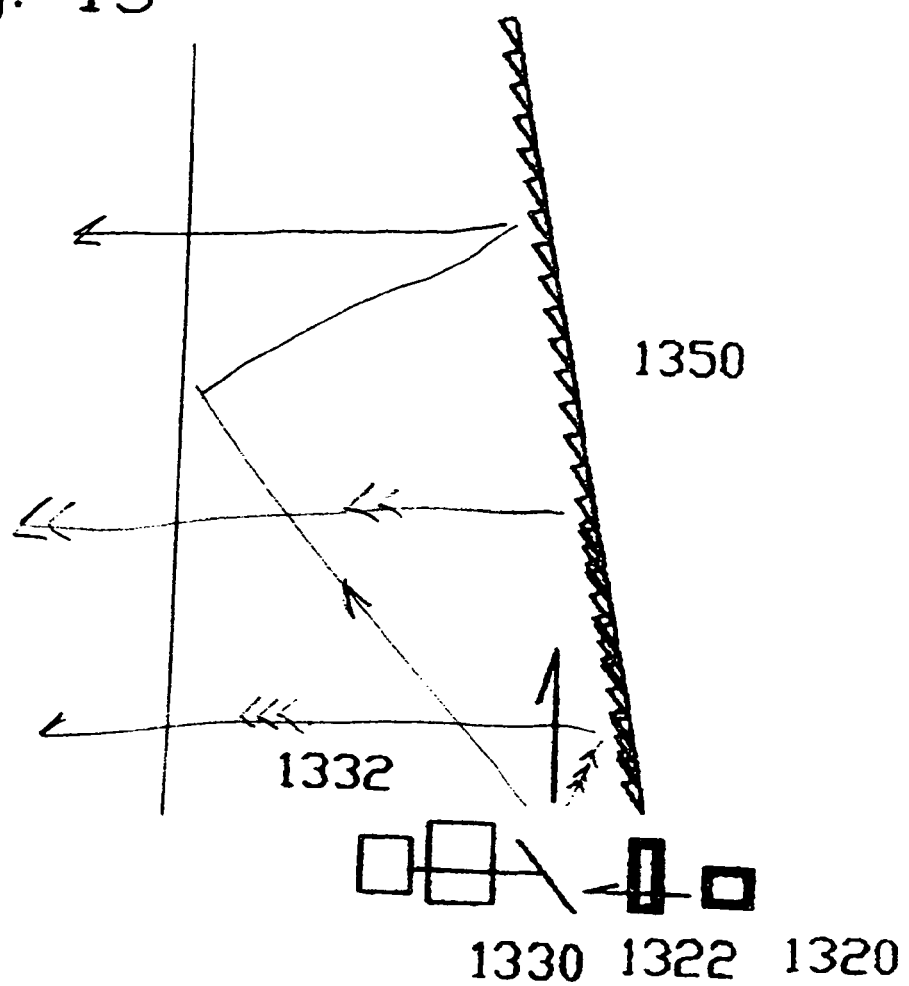
FIG. 13 presents a cross-sectional view of a lenticular screen.

FIG. 13 presents a cross section of the translocation reflector method with a lenticular type screen. The components are an LEE array 1320, a FOE array 1360, a translocation reflector 1322, an actuator 1330, a counterweight 1332 and an position encoder 1340 and a screen 1350. In operation, a section of the full view is presented on the LEE 1320, focused by the FOE array 1360, reflected by the translocation reflector 1322 and the screen 1350. The screen may be of a fresnel, lenticular, stepped or holographic construction such as to present a focused image of the LEE 1320 to a viewer. A circular polarizing window 1360 may be placed between the observer and the screen to extinct external ambient light.

Figure 14:
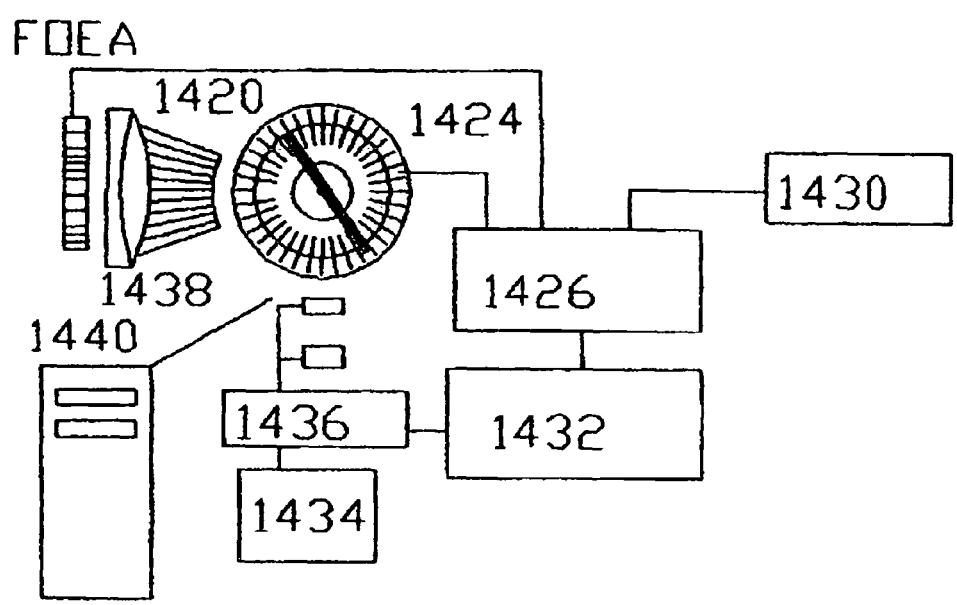
FIG. 14 presents a cross-sectional view of a block diagram of the interfaces between components.

FIG. 14. presents a block diagram of the fundamental relationships between the components in the present invention. In operation, the position of reflector 1420 is monitored by encoder 1424 which sends a signal to computer 1426 updating the frame register and frame buffer address 1432 to the full image buffer memory 1434. The data output is fed up driver circuitry 1430 for the LEE array 1438. Interfaced to the computer 1426 is the TIM 1440. The computer may have an external link 1430 to devices including cable transmission, data storage, workstations, VCR, etc.

Figure 15:
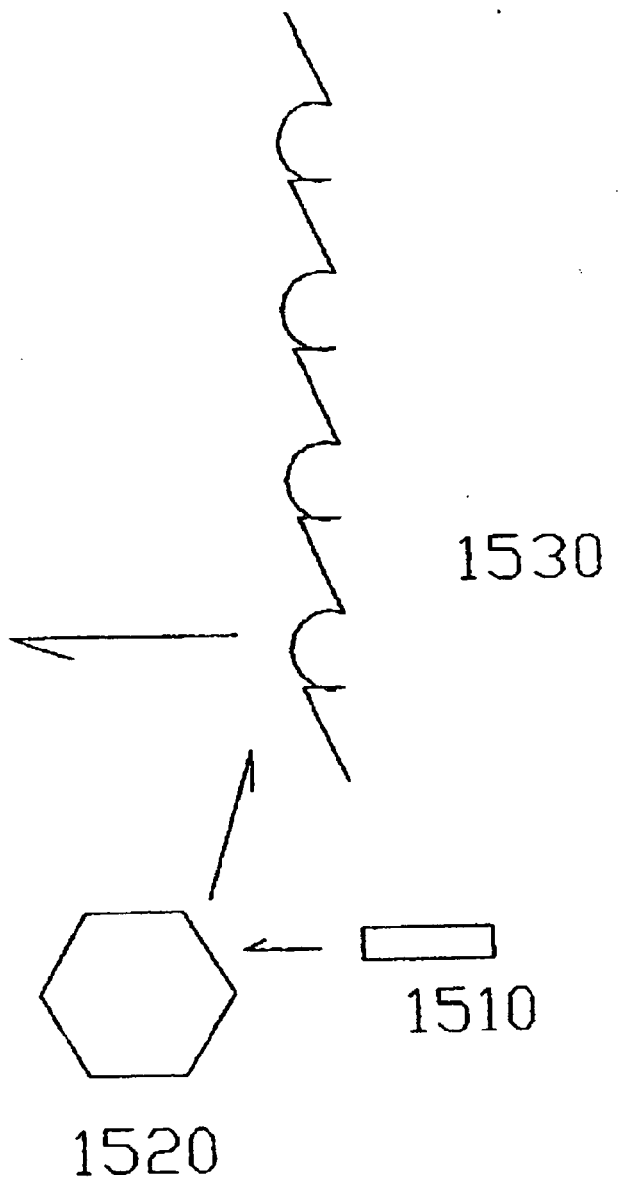
FIG. 15 presents a cross-sectional view of a rotating polygon embodiment.

FIG. 15 presents a rotating polygon embodiment of the present invention. The system projects an image of the LEE 1510 by scanning a rotating reflective polygon 1520 and projecting the image onto a viewing screen or reflective micro-optic surface 1530 viewed by the observer 1540. A circular polarizing aperture 1550 may be placed between the screen 1530 and the observer 1540 and the LEE 1510 output modulated to produce a range of elliptical polarization whereby the external ambient light is extincted while the image of LEE remains visible. The LEE 1510 modulation may be used to control color and intensity as well. The LEE 1510 although shown as a single row may be constructed of multiple rows thereby projecting either a 1D array of elements optically-combined for increased brightness or intensity modulation, or a 2D array. As a 2D array with appropriate spacing between elements, the optical deflection angle may be reduced to the spacing arc. This technique in combination may be used for large stereoscopic, autostereoscopic and monoscopic projection systems.

Figure 16:
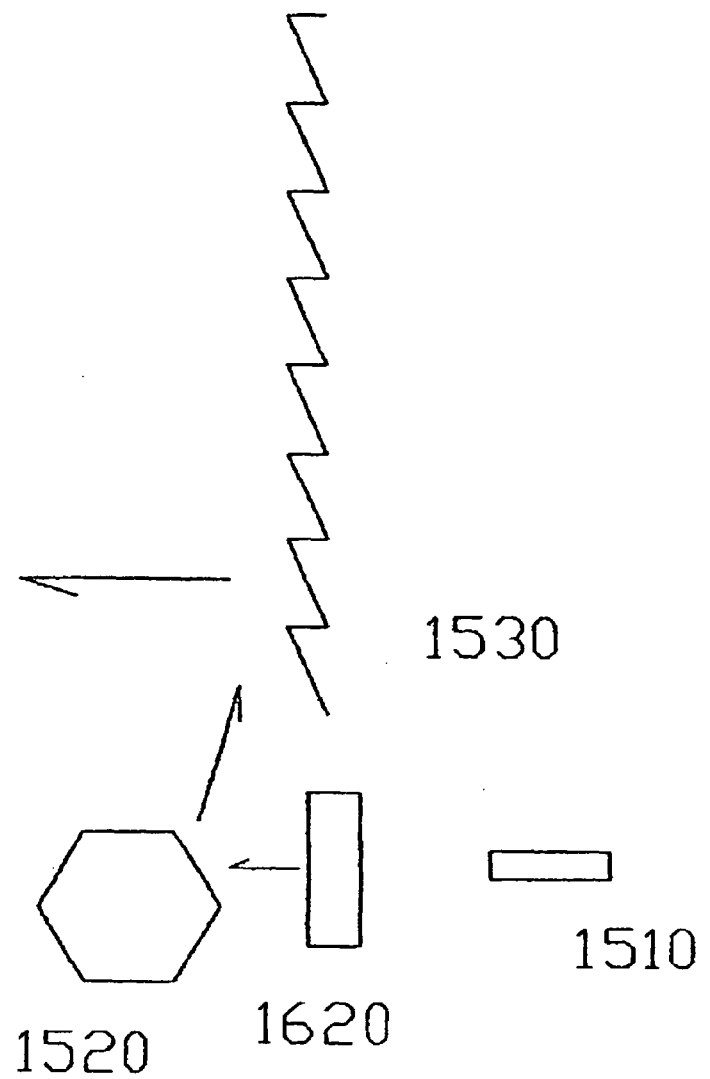
FIG. 16 presents a cross-sectional view of a FDOE.

FIG. 16 presents the embodiment of FIG. 15 with an FDOE 1620. A TIM and position encoder may be employed.

Figure 17:
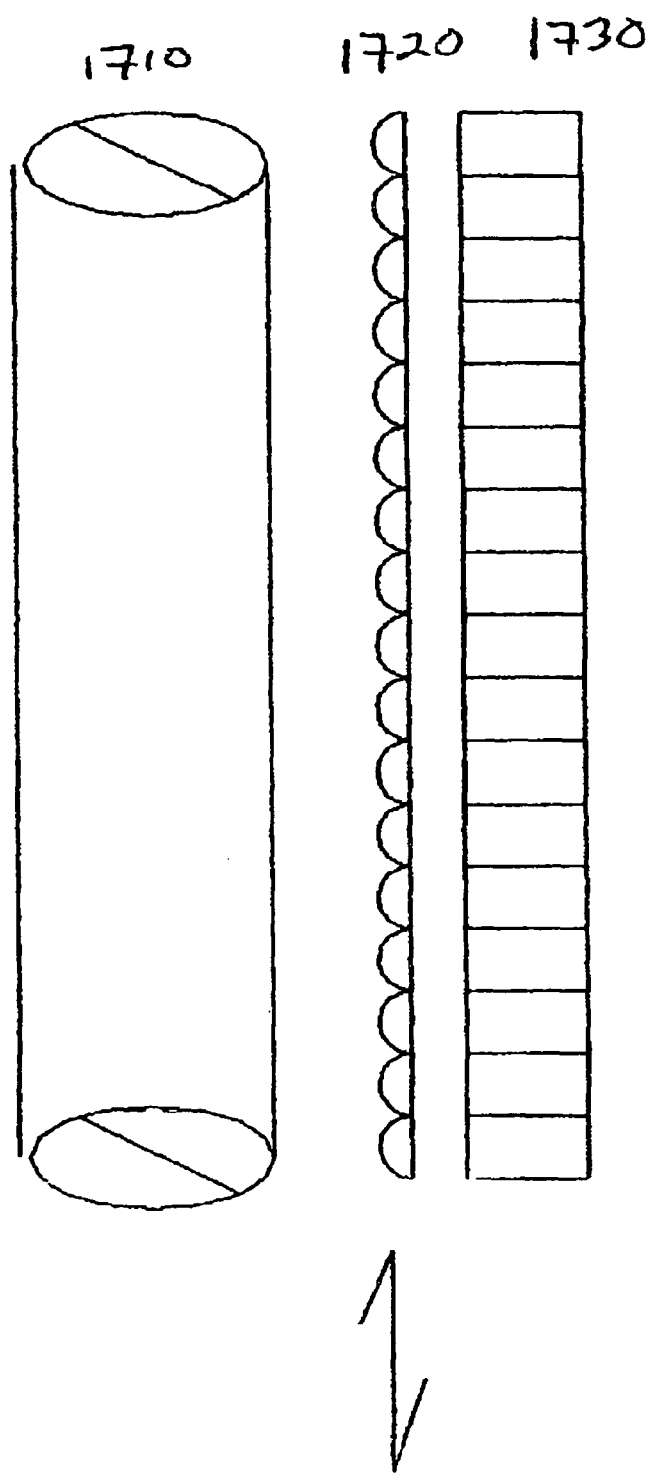
FIG. 17 presents a cross-sectional view of an interlaced TIM.

FIG. 17 presents a embodiment of the transducing interlaced mask system. In operation, the scanner 1710 scans an image of the transduced interlaced mask 1720 which is construct of a series of apertures and collecting regions of the LEE 1730. The transducing elements may be mechanical such as a piezo, voice-coil, or other displacement device or optical such as LCD, acousto-optic, SLM, diffractive or other mechanism.

Figure 18:
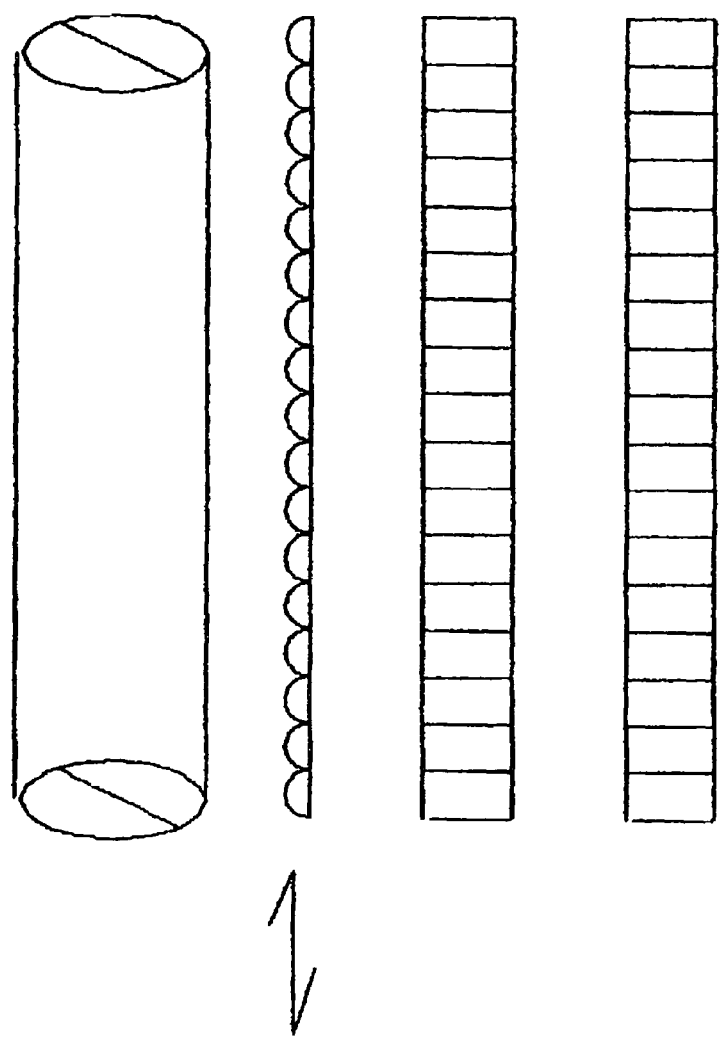
FIG. 18 presents a cross-sectional view of a FDOE and TIM.

FIG. 18 presents the embodiment of FIG. 17 with an FDOE 1820. A TIM and position encoder may be employed. A scanner 1810 projects the FDOE 1820 modulated image on the transduced interlaced mask 1830 of the LEE 1840.

Figure 19:
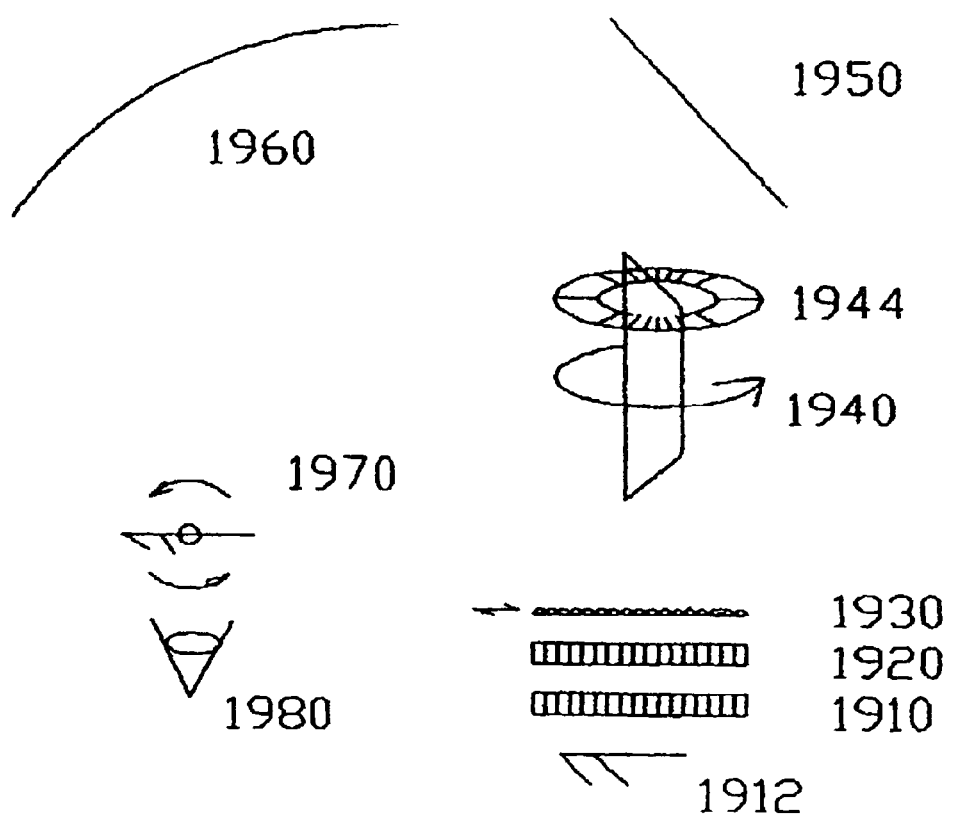
FIG. 19 presents a cross-sectional view of a Dove prism embodiment.

FIG. 19 presents a cross-sectional view of a prismatic embodiment of the present invention. The components are the LEE array 1910, the TIM 1920, the FDOE 1930, the Dove prism 1940, an position encoder 1944, a first reflector 1950, and a second reflector 1960. The viewer's eye is represented by the icon 1980. In operation, the image of the LEE array 1910 is projected through the Dove prism 1940 and the other optical components to the viewer's eye 1980. As the Dove prism is rotated orthogonally 1942 to the LEE beam, the linear image 1970 of the LEE is rotated a twice the rate. The result is a circular image of the linear array. As each increment angular displacement, the position encoder signals the projection of the corresponding linear section of the full view. Multiple LES, set radially, may be employed to reduce the necessary rate of rotation or increase the resolution. The TIM 1920 and FDOE 1930 may be integrated into the image. Reflector 1950 may be a beam splitter sending similar images to both eyes. Other optical paths including a direct view without reflectors 1950 and 1960 may be used. Dual coordinated systems may be employed for stereo viewing.

Figure 20:
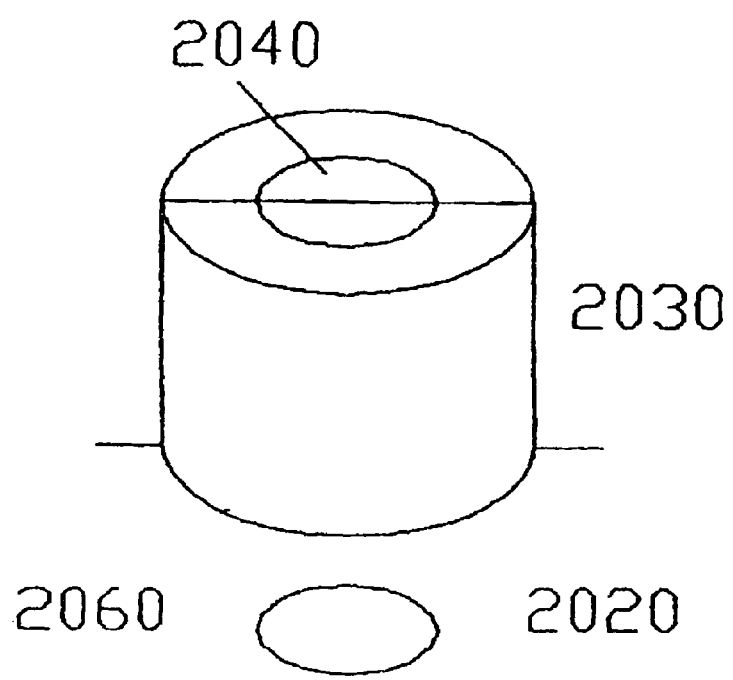
FIG. 20 presents a cross-sectional view of a piezo-optic FDOE.

FIG. 20 presents a perspective view of one embodiment of a single element of the focal distance optical element. The components are the LEE 2020, a piezoelectric cylinder 2030 and a variable optical element 2040. In operation, an electrical charge applied to the piezoelectric cylinder 2030 varies the compression of the enclosed optical material 2040 resulting in a change in the focal length of the optical element. To a viewer, the LEE will appear to vary in distance when the eye adjusts to the minimum focus. This approach requires a dark region 2060 adjacent to the focusable element for single elements, or an image edge. Focal length adjustment may also be effected by electrostatic reflective membrane arrays, gradient index liquid crystal arrays, SLMs, diffractive elements, multiple internal reflections and other known technologies.

Figure 21:
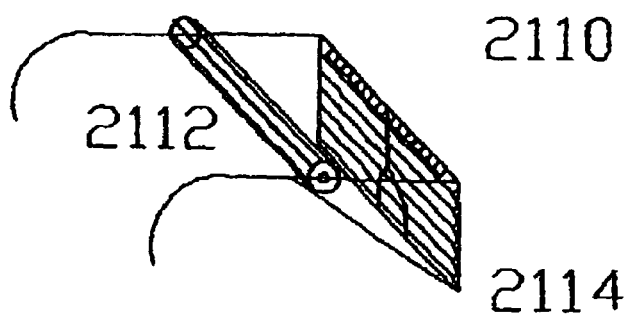
FIG. 21 presents a perspective view of a scanning reflector stereo viewer.

FIG. 21 presents a perspective view of rotating reflector 2120 goggle structure with LEE arrays 2110 and a lenticular reflector screen 2130. Optional FDOE, TIM, and electronic interconnections are omitted from the diagram.

Figure 22:
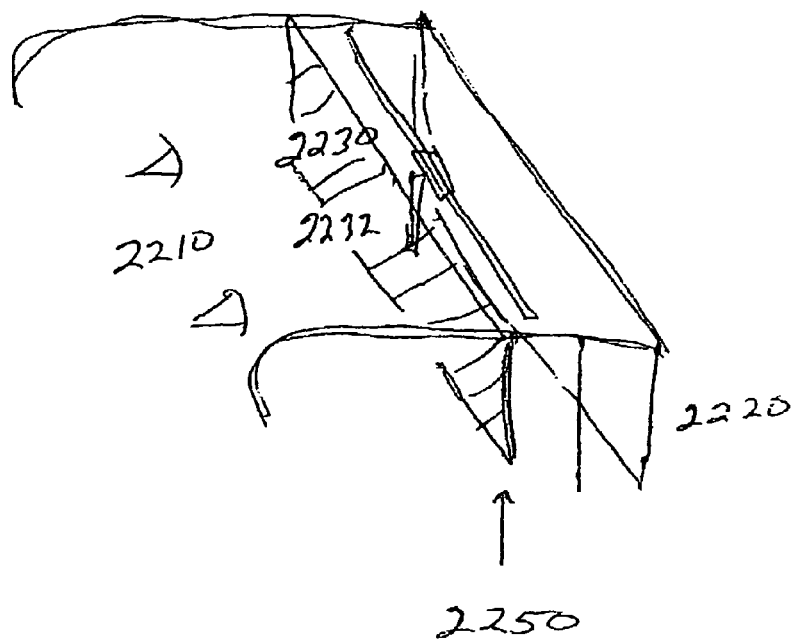
FIG. 22 presents a scanning stereo viewer using micro optic domains with a polarizing aperture

FIG. 22 presents a scanning stereo viewer using micro optic domains with a polarizing aperture. Similar to the embodiment of FIG. 21, an image is projected onto a screen 2220 from scanner 2230 or 2232 and viewed by observer 2210. A transparent polarizer window 2250 is interposed between the observer 2250 and the screen 2220. The screen may be constructed of reflective micro domains which focus the image to one observer or disperse the image for multiple observer. The beams of light from the scanner 2230 are either unpolarized or the polarization is modulated to control intensity or color.

Figure 23:
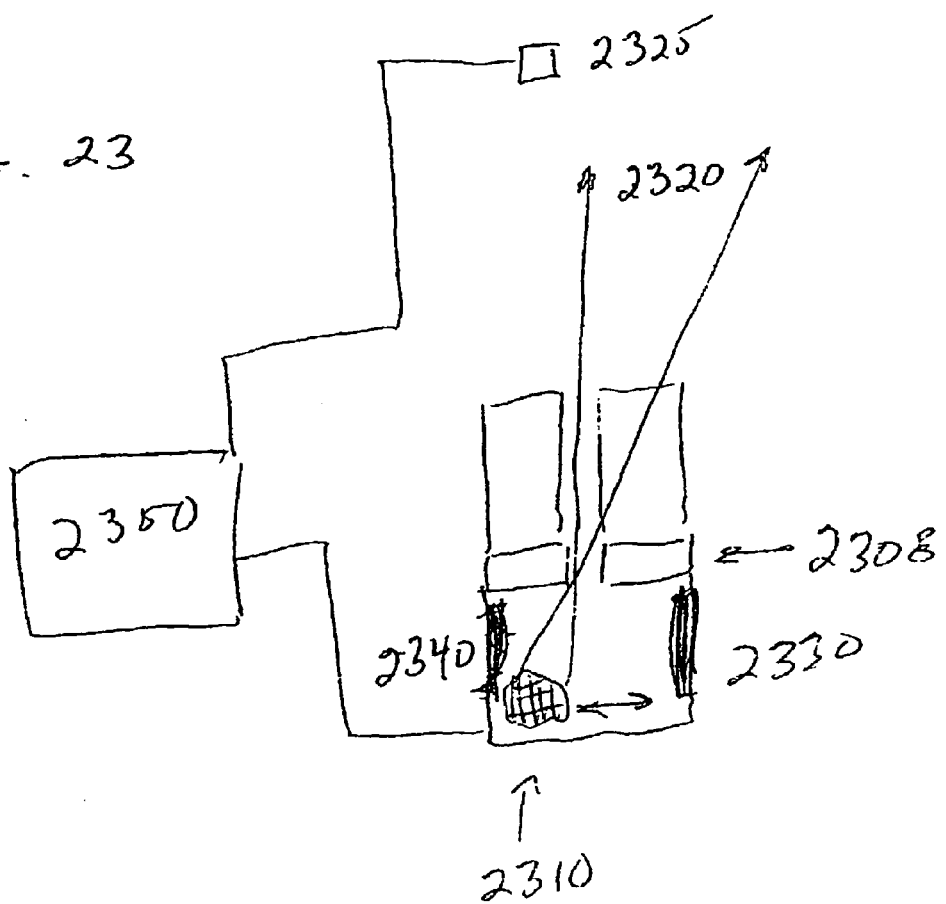
FIG. 23 presents a scanning stereo viewer using plasma cavity

FIG. 23 presents a scanning stereo viewer using plasma cavity. The individual elements may be a one or more dimensional array and may be located on the screen or at a central focal point. In operation, for two view stereoscopy, the output from the light focusing aperture 2308 of the illuminated plasma region 2310 is in a solid cone 2320. By means of field control elements 2330, electromagnetic control elements 2340, piezo or other means, the plasma region 2310 is made to cyclically translocate, causing the output cone 2320 to sweep a designated region. An imaging computer system 2350 synchronizes the image to the sweep position. In a closed loop feedback embodiment, a CCD or other similar reference element 2325 receives a register beam controlling the modulation of the image. As a two-dimensional array, this embodiment may be used as an scalable autostereoscopy screen, mounted as a continuous array over the field of view of the observer analogous to the TV panel 120, 125 of FIG. 1. Alternatively, this embodiment may be a stand alone panel.

Figure 24:
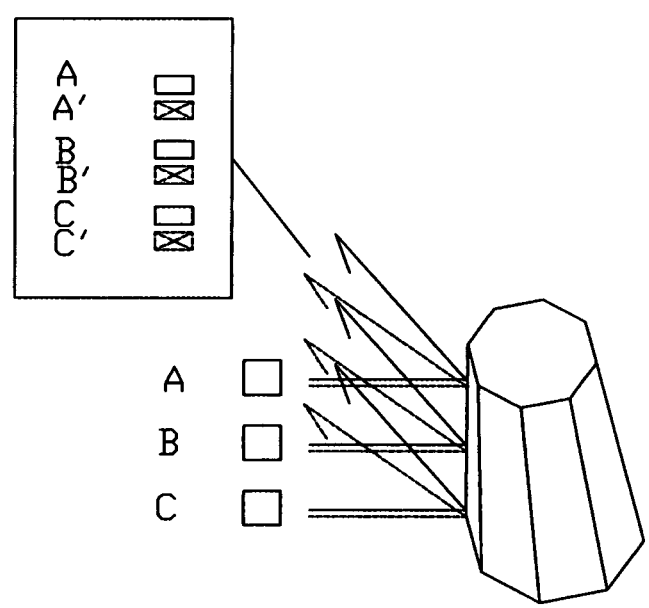
FIG. 24 presents a lenticular screen viewer field stereo viewer

FIG. 24 presents an autostereoscopic embodiment of the present invention. A lenticular-type screen 2410 is used to project the scanned image of a viewer field array of LEE 2460 to a range of observers 2430, 2432. At each position in the audience, the observer will see a distinct image with each eye. In FIG. 24, the lenticular array is used to provide vertical dispersion. The screen may be bidirectional and impart horizontal parallax as well when coupled with a singe view horizontally scanned LEE array. In operation, the scanning mechanism may be closed loop coupled to an encoder 2442 whose registration is proximal or distal in the form of receiving arrays 2444 near the screen or 2446 at the audience. A transparent circular polarizing window 2420 may be placed between the observer 2430 and the screen 2410 to extinct ambient light. It may be understood that the aperture array 2450 and multiple view LEE array 2460 may be consolidated into a single view LEE array and a lateral beam deflection mechanism. A lateral transducing element may be added to the aperture array 2450 to interlace a higher resolution. Another configuration utilizing a similar architecture may place the lenticular array vertically with lateral scanning and vertical viewer dispersion.

The scanning approach presented in the present invention provides a direct, inexpensive and uncomplicated method to project a visual image with 3D qualities. The image is further enhanced by using focal distance optical elements to correct a significant shortcoming of most stereoviewers. The multiple port or array approach reduces the rotational or translocation cycle rate necessary for a given resolution and facilitates high resolution displays. As an example consider a 100 LEE array with 8 positions per cycle, 1000 cycles per frame at 30 Hz and a displacement cycle rate of 240 KHz The duration of single element is 2.5 microseconds per cycle, or 75 microseconds per second. Maximum resolution requires unfilled space between image elements.

The position encoder replaces the need for a precise control of the rotational or translocation system. This is important in coordinating stereo systems. Further, absolute registration of a frame relative to a person's view is important in stereo systems to insure proper stereoscopy and precise positioning of the head-eye-object orientation in virtual reality or vertically systems.

The features and methods presented herein may also be used to produce a useful monocular, screen or projection display.

Figure 25:
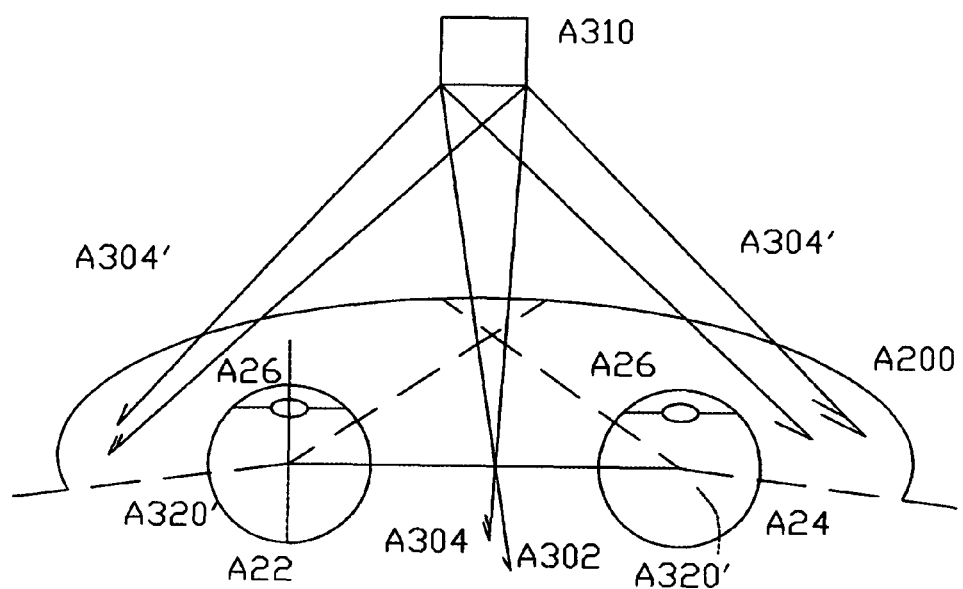
FIG. 25 shows a perspective view of a display embodiment of the present invention.

FIG. 25 shows a top view of the virtual image in a head mounted display embodiment of the present invention where the virtual beams A302, A304 representing the object A310 are shown intersecting the screen A200 at the approximately location and angle required to replicate the beam pattern which would exist in real space. Thus the position of the observer's eyes within the constraints of the display A10 are irrelevant to accurate perceive an image. The optics required to produce this beam pattern are not straightforward and may be achieved with a constant, discontinuous, flat wavefront. The principal image beam convergence point A320 behind that of the lens of the eye A26, A28 preserves the relationship independent of the eyes A22, 24 relative position to the screen A200. Alternatively, two eye-related convergence points A320' may be established.

Figure 26:
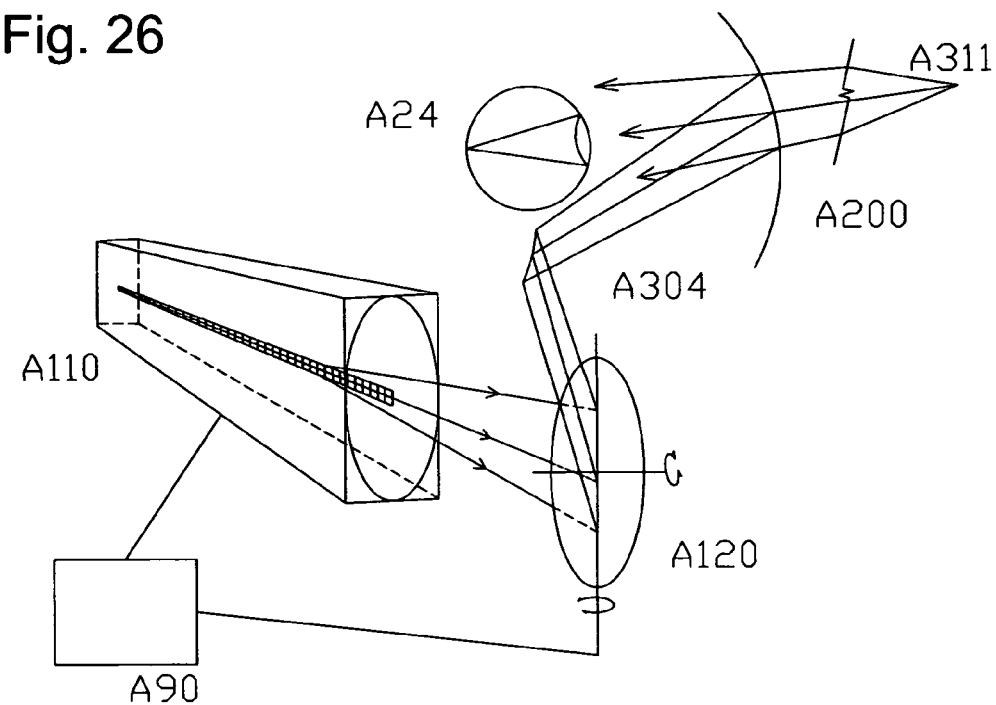
FIG. 26 shows a top view of a head mounted display embodiment of the present invention.

FIG. 26 shows a perspective view of the linear array, continuous focal distance embodiment of the present invention where the component parts of the light source and scanning assembly A100 are shown including a image computer A90, a linear array of light sources A110, and a two axis, scanning mirror A120. In operation, the computer A90 communicates with the scanning mirror A 120 through an open loop drive system, closed loop position feedback or other known positioning system and illuminates those light sources A110 which correspond to the image points A310 to be displayed. The divergent beams from each light sources A110 may be focused by the eye A24 to correspond to the appropriate object distance.

While the linear array of light sources A100 is shown as an array of light emitters such as LEDs (light emitting diodes) which are driven by an image computer A90 through circuits not shown, alternative light sources may be employed. Examples of such alternatives include electronically, optically or mechanically activated emitters, shutters, reflectors, and beam modulators. Specifically an FLCD shutter array as shown in Fig., a fluorescent or two-photon emitter as described by Elizabeth Dowling, or a mechanically reflector such as Texas Instruments DMD device may be used.

In all optical systems the axial image or zero-order view may be block and the image formed from the divergent beams from the emitter.

Figure 27:
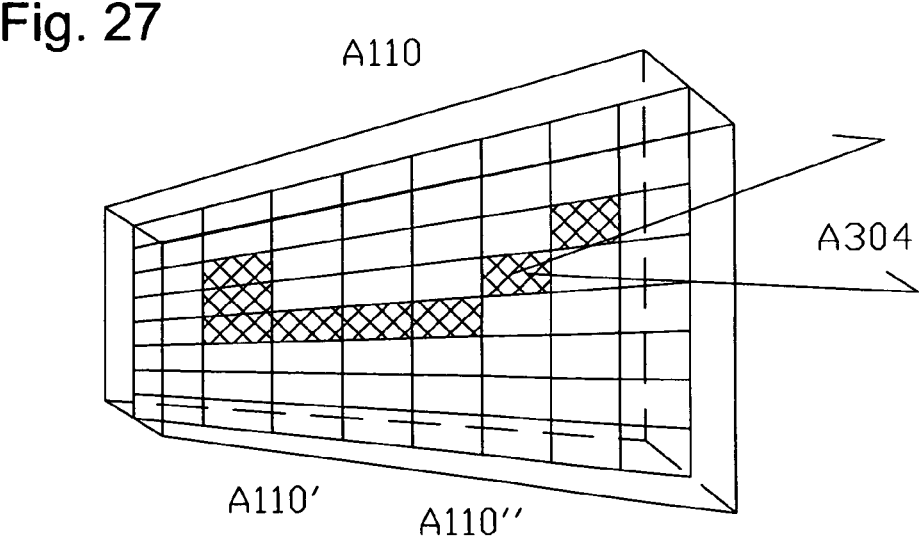
FIG. 27 shows a perspective view of the linear array, continuous focal distance embodiment of the present invention.

FIG. 27 shows a perspective view of the 2D planar array, continuous focal distance embodiment of the present invention where a two dimensional matrix of light sources A110, A110' which produce the image beams A304. Although a multiplicity of 2D arrays A110 may be used to produce a 3D matrix full display, a preferred embodiment combines the 2D array with a scanning mechanism A120 to create the full image.

Figure 28:
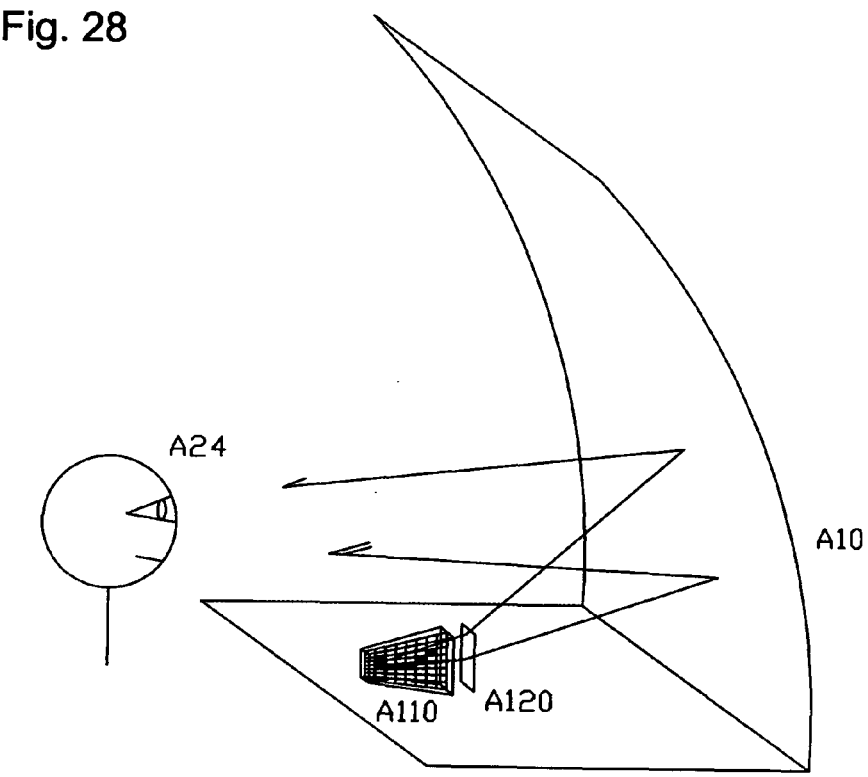
FIG. 28 shows a top view of the linear array, continuous focal distance embodiment of the present invention with scanning elements.

FIG. 28 shows a side view of the planar array, continuous focal distance embodiment of the present invention applied to an autostereoscopic display where the light source A110 and scanning assembly A120 project the beams towards the screen A200 and then to the observer's eye A24. It may be understood that the scanning assembly A120, projection optics and screen A200 may include embodiments of my previously filed and co-pending patent applications for autostereoscopic displays, thereby incorporating the present invention in the function of the light source and focal distance control.

Figure 29:
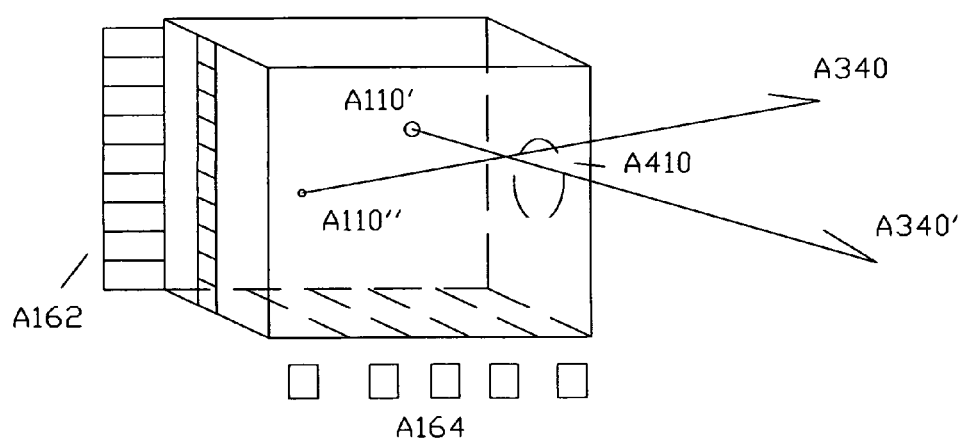
FIG. 29 shows a top view of the planar array, continuous focal distance embodiment of the present invention.

FIG. 29 shows a perspective view of a two-photon activation embodiment of the present invention. Over the past fifty years, researchers have developed a number of techniques for the photo-activation of light emitters. In recent years, Elizabeth Dowling of Stanford University has perfected a technique using a two-photon activation method. This approach may be useful employed as a light emitter in the present invention.

Figure 30:
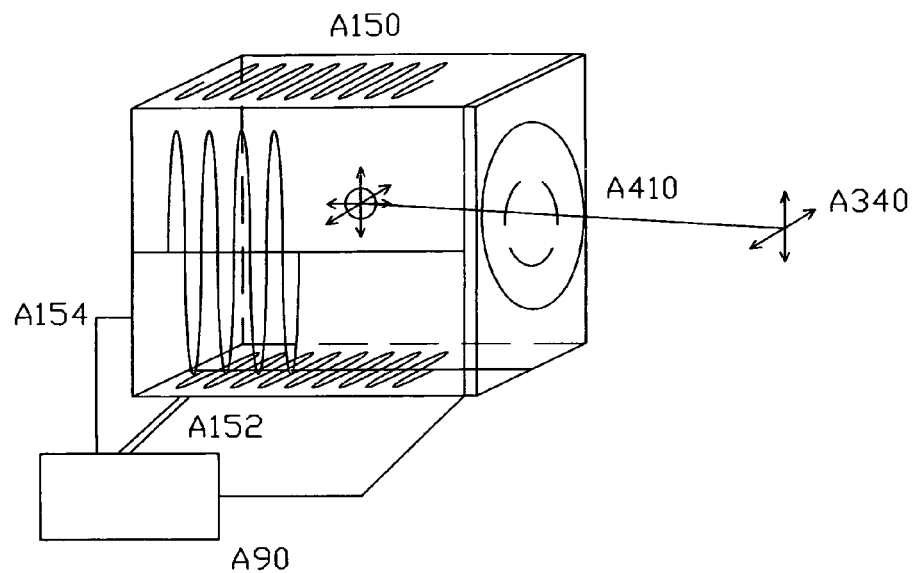
FIG. 30 shows a top view of the planar array, continuous focal distance embodiment of the present invention applied to an autostereoscopic display.

FIG. 30 shows a perspective view of a plasma or floating emitter activation embodiment of the present invention where a light emitting region where a defined light emitter region A110 is displaced in space and activated under the control of the image computer a90, the displacement field control structures A 150 and the activation signal A154. The output beam A340 is structured by output optics A410.

Figure 31:
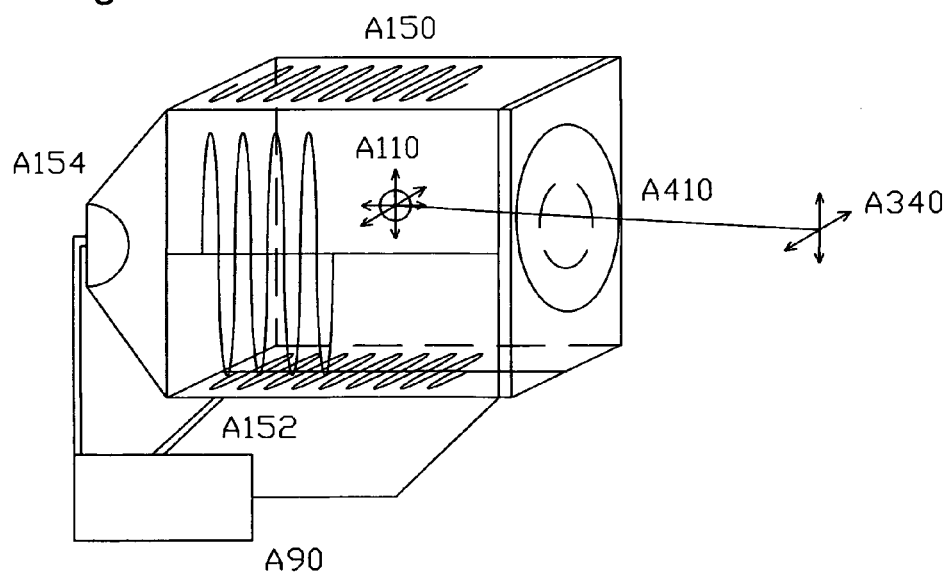
FIG. 31 shows a top view of the planar array, continuous focal distance embodiment of the present invention applied to a head mounted display.

FIG. 31 shows a perspective view of the reflector or optically activated emitter activation embodiment of the present invention where a light emitting region where a defined light emitter region A110 is displaced in space and activated under the control of the image computer a90, the displacement field control structures A150 and the activation signal A154. The output beam A340 is structured by output optics A410.

FIG. 32 shows a side view of the angled reflective planar array, continuous focal distance embodiment of the present invention where the light source A110 and scanning assembly A120 projects the beam towards the screen A200 and then to the observer's eye A24. Specifically, a light source A102 and reflector A104 illuminate an array A110, A110', A110" shown as a section of a planar array which provides depth function for a multiplicity of image pixels. A ray A304 from the appropriate pixel A110 corresponding the depth function of the pixel is reflected to the imaging optics A410, the scanning optics A120 shown as a rotating mirror, and a reflective HOE optical element A410' which imparts the angular divergence required to present the proper cone of rays to the HOE augmented reality screen A200 and then to the observer's eye A24.

Figure 33:
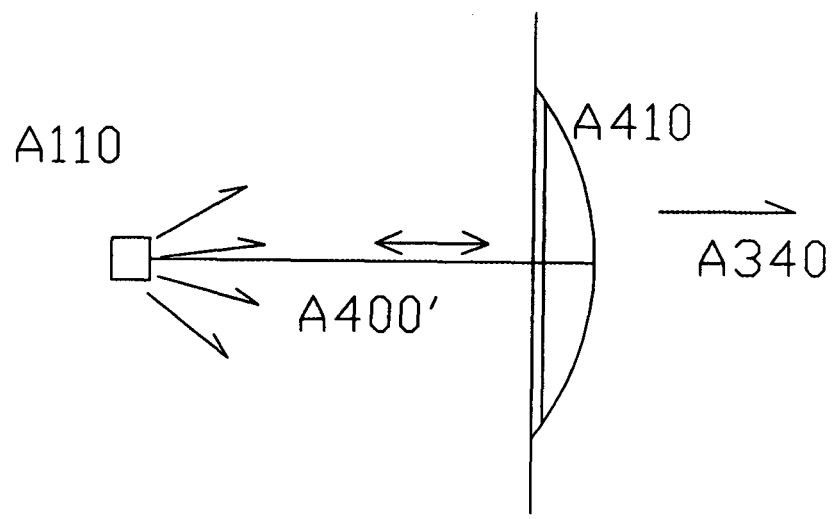
FIG. 33 shows a perspective view of a plasma activation embodiment of the present invention.

FIG. 33 shows a side view of an improved aberration free light source and scanning assembly A10 where a light source A110 is scanned affixed to a movable member A400 affixed to a point on the plane of the projection optics A410 and the output beam is emitter about a path diverging generally along the movable member A400.

The light source A110 and movable member A400 may be chemically, electrodynamically, mechanically (physical, piezo, acousto), or optically displaced in a resonant or pixel determined fashion. Multiple light sources A110 may be affixed to the movable member A400 with intervening non emitting regions thus reducing the required displacement required. The movable member may be cyclically or predeterminably lengthen and shorten to impart a variable focal length. A multiplicity of movable members may be employed. The electronic circuits, which may be formed from transparent conductive films, are not shown. This approach may be used in low cost consumer and toy applications.

Figure 34:
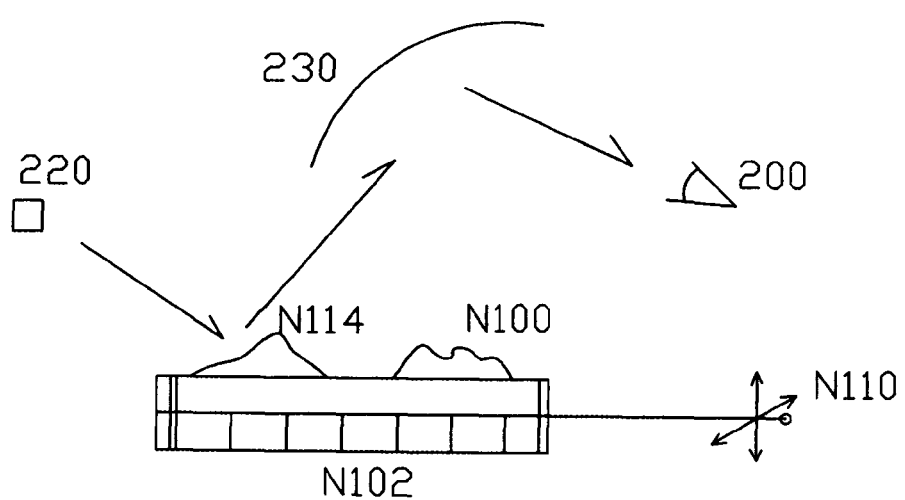
FIG. 34 shows a perspective view of a deflected, tethered light emitting element activation embodiment of the present invention.

The present invention optimizes the current performance/cost parameters of commercially available processes. Contemporary, medium cost, high-speed, light sources, either emitters or shutters, together with associated electronics have digital modulation frequencies in the range of 10-100 MHz. A full field display should have at least 2000.times.1000 pixels of resolution (2 megapixels) and a refresh rate of 72 Hz. The resultant data rate for a single plane, single emitter light source is 144 MHz. When 24 bit color depth is added, a digital modulation frequency must be increased by at least a factor of 8. Adding focal depth of 10,000 points, a modulation frequency of over 10 terahertz is required. Thus is it apparent that a simpler, more cost effective approach is an increase in the number of light sources. The present invention provides a direct solution to this problem. Section Two FIG. 34—Multiple Axis—presents a perspective view of a preferred embodiment of the present invention wherein the deformable membrane incorporates a pattern permitting an increased range of the redirection of the incident radiation. The structure is comprised of a deformable membrane N100 suspended above or between one or more programmable electrodes N102, which may be transparent. In one configuration, the incident beam N104 is reflected from the membrane N100 towards the visor mirror 230 and observer's eye 200. In operation, the control electronics N110 applies a variable charge to electrodes N102 causing a localized deformation N114 of membrane N100. The amplitude and timing of the applied charge may cause the localized deformation N114 to travel about membrane N100 in a vector or raster pattern. the deformation of membrane N100 is synchronized with the modulation of LEE 220 causing a specific image pixel to be illuminated. The pattern may simultaneously control the spatial distribution and the wavefront of the beam, creating the impression of a variable focal distance with spectral and 3.sup.rd and 5.sup.th order optical aberrations corrected. The membrane N100 and structure may be mounted upon a translocatable, movable or resonant structure to further enhance its range and applications.

The membrane may be lateral or other incisions/discontinuities for a linear translocation.

Heterogeneous chemical and mechanical domains in the membrane may be included and individually activated by photonic, mechanical, magnetic or electronic means.

Figure 35:
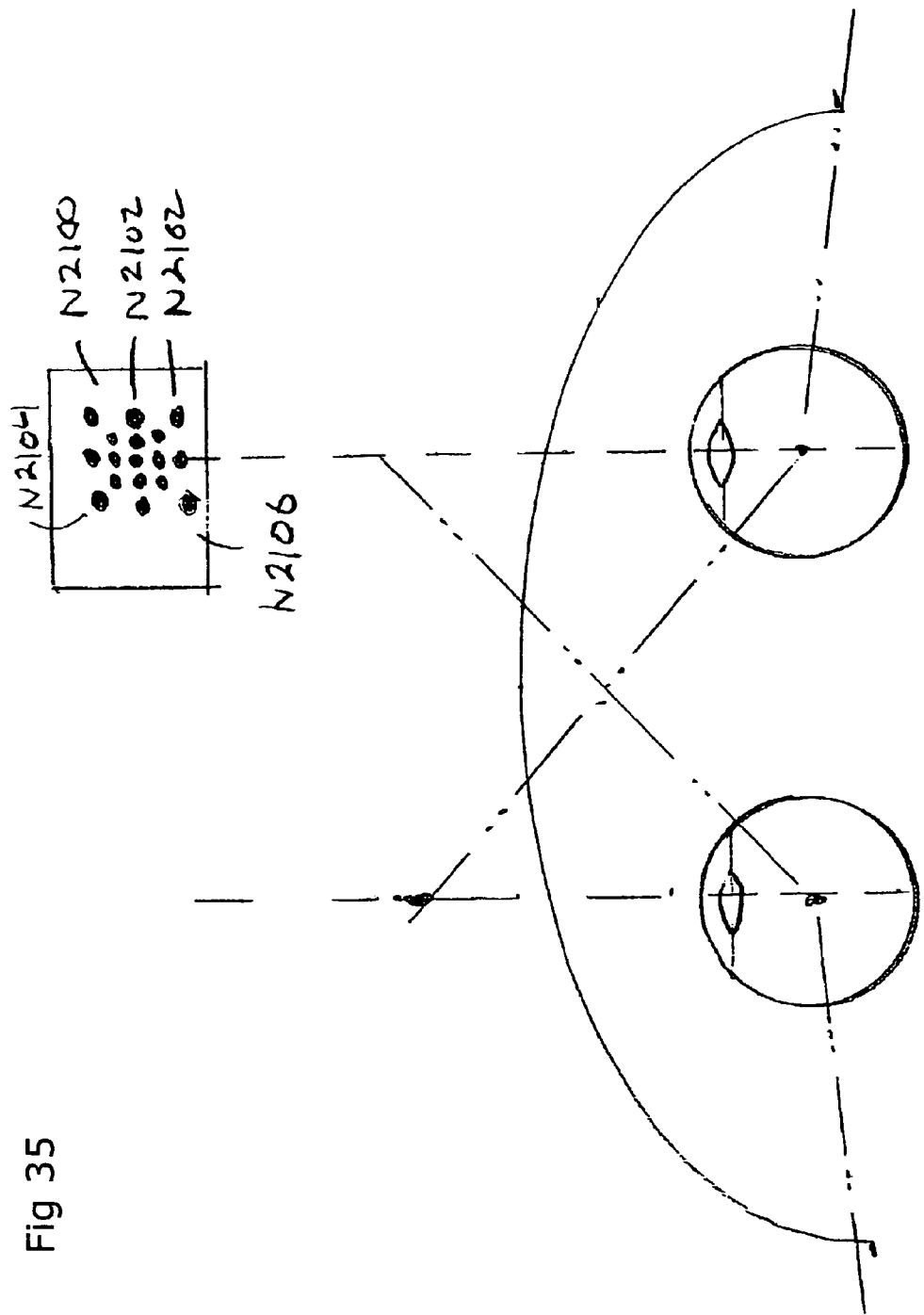
FIG. 35 shows a perspective view of a three dimensional acousto-optic deflection of apparent light source embodiment of the present invention.

FIG. 35—Interneural Motion Processing—presents a preferred embodiment of pixel pattern N2100 containing multiple pixels N2102 which are illuminated simultaneously or with discrete recalculated intervals. While the human retinal captures photons in microseconds, processing by the retinal neural system imparts a time course which acts to enhance or inhibit adjacent biological vision pathways. A single scanned photon may when illuminated at a certain frequency induce the cognitive visual impression of motion in the opposite direction. At a image level, this is observed in the spoked wagon wheels of older Western films. At the biological level, the result may be confusing and ambiguous, thereby substantially reducing a fighter pilots response time, for example.

Many image processing systems compute the next image well in advance of the 72 hertz visual refresh rate and may extrapolate images to include the intensification of certain pixels N2104 or the reduction of other pixels N2106. When correlated to visual field speed, this enhances the observers response. Reference: USAF Advanced Flight Cockpit Study, MIT, 1997.

FIG. 36—Interocular and Retinal Distance, Shape and Range of Movement—presents a preferred embodiment incorporating the dynamic interocular distance and orientation control. One method of alignment and orientation of immersive displays employs one or more test patterns which provide the observer an alignment or adjustment reference. Standard tests for image position, focal distance and stereo alignment may be incorporated in manner similar to adjusting a pair of binoculars or stereomicroscope. Additional tests which incorporate dynamic motion and require hand-eye coordination may be included.

In the present invention, two complementary improvements are employed which permit dynamic adjustment. The first part measures the range of eye motion of each eye by recording the limited of the iris movement. The second parts the range of retinal image focus and position by projecting a visible or invisible test image and recording the dynamic changes of eye position and focus.

This is accomplished by monitoring the eye state by means of a reflected beam N7120 and a reflected image detector N7112 which may range from a single photodiode to a full color hi-speed camera. An incident beam 170 which may be visible or invisible is reflected from the iris N7200, the retinal N7202, or the eye lens N7204. Spectrographic analysis may be used to identify the source of the reflected beam.

The control computer 160 receives the data from the image detector N7112 and other external systems including the interocular distance which is either fixed or includes a known measuring detector (not shown). This provides sufficient information for the calculation of the orthogonal visual axis of the immersive display relative to the observer and permits an adjustment of the display image including apparent focal distance, stereo image disparity, and visual axis orientation.

This dynamic adjustment may be useful convenience for all users and of crucial importance to fighter pilots and other environments where high stresses may cause a physical displacement or distortion of the display or body morphology. An test example for dynamic control would measure the retinal shape and curvature by monitoring the focus of a scanned point in a single photodiode detector system or the width and curvature of a line with a two dimensional detector array. Dynamic monitoring of retina would correct for G forces and other anomalies during high speed turns by fighter pilots and astronauts.

Additional external eye state systems such as are manufactured by ISCAN, Inc. may be employed and the data integrated by the control computer 160.

Figure 37:
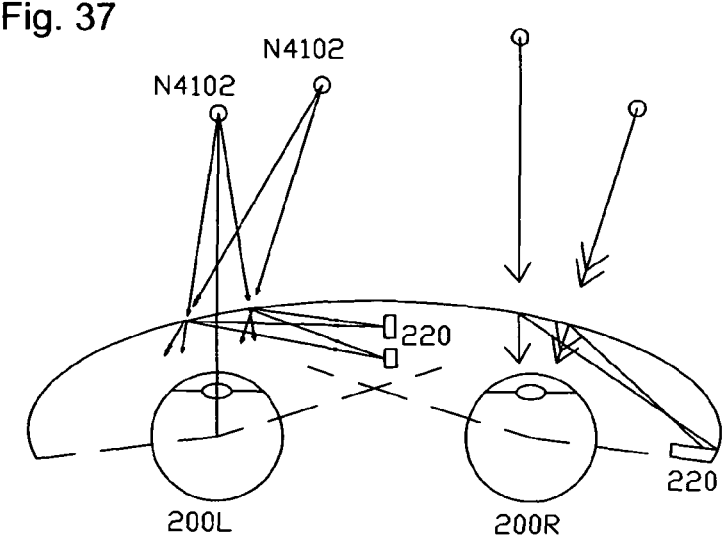
FIG. 37-39 presents a panoramic embodiment of the present invention.

FIG. 37—Distant Focus—presents a preferred embodiment wherein a fixed focus length is set by multiple horizontal elements which are vertically scanned. Other orientations may be employed. Alternatively as shown in FIG. 4A, one or more emitters 220 may be used in a scanning system. In this FIG. 4 emitter may include the other optical emitter group components including variable focal length. The left eye 200L observes a virtual image at point N4102. The right eye 200R observes a image set at infinity. While the relative position of point N4102 in relation to the left eye 200L is important, it is less so in the infinite focal length example. With all image points being compressed into the infinite plane, image object occlusion disappears. A object only viewed through an aperture would still be subject to minor occlusion at a global scale The variable focal length faculty of the present invention may be exploited to permit global or sectional virtual screen at a fixed focal length—with or without correct stereoscopic image disparity. This technique may be used for medical and performance diagnostic, data compression and reduction as well as all other purposes. A virtual screen set beyond the normal accommodative limits of the human eye (approximately 400 meters through infinity) may be minimize the impact of incorrect stereoscopic inter-ocular alignment. Under these circumstances, the projected cone of rays emanating from each pixel need not illuminated the entire pupil travel domain but may subtend the solid angle from the general region of the image object.

Figure 38:
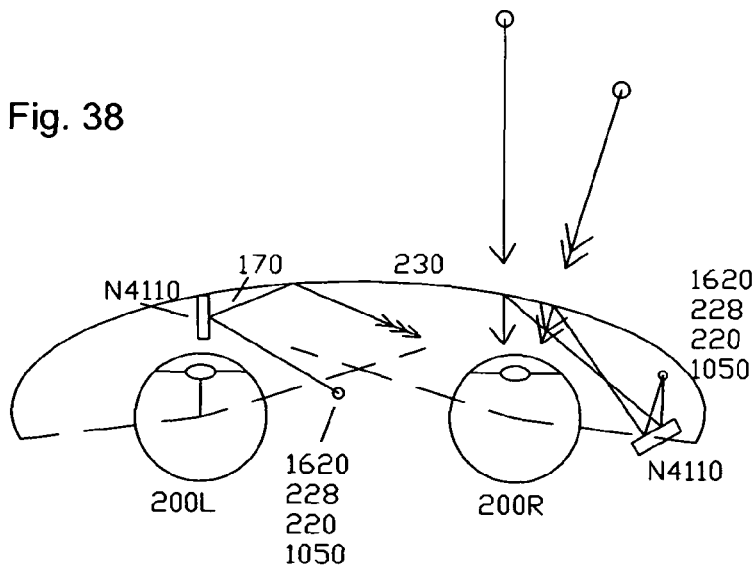

FIG. 38 shows a representative example where an intermediate transfer reflector (or transmitter) N4110 is employed. The beam 170 exits the optional focal length control 1620 if employed and is reflected (or transmitted) by intermediate transfer reflector (transmitter) N4010 towards the visor reflector 230 and to the observer 200. The reflectors may be positioned in any location or combination including but not limited to above and below the eye plane, across the field of vision, at the periphery or the center.

Figure 39:
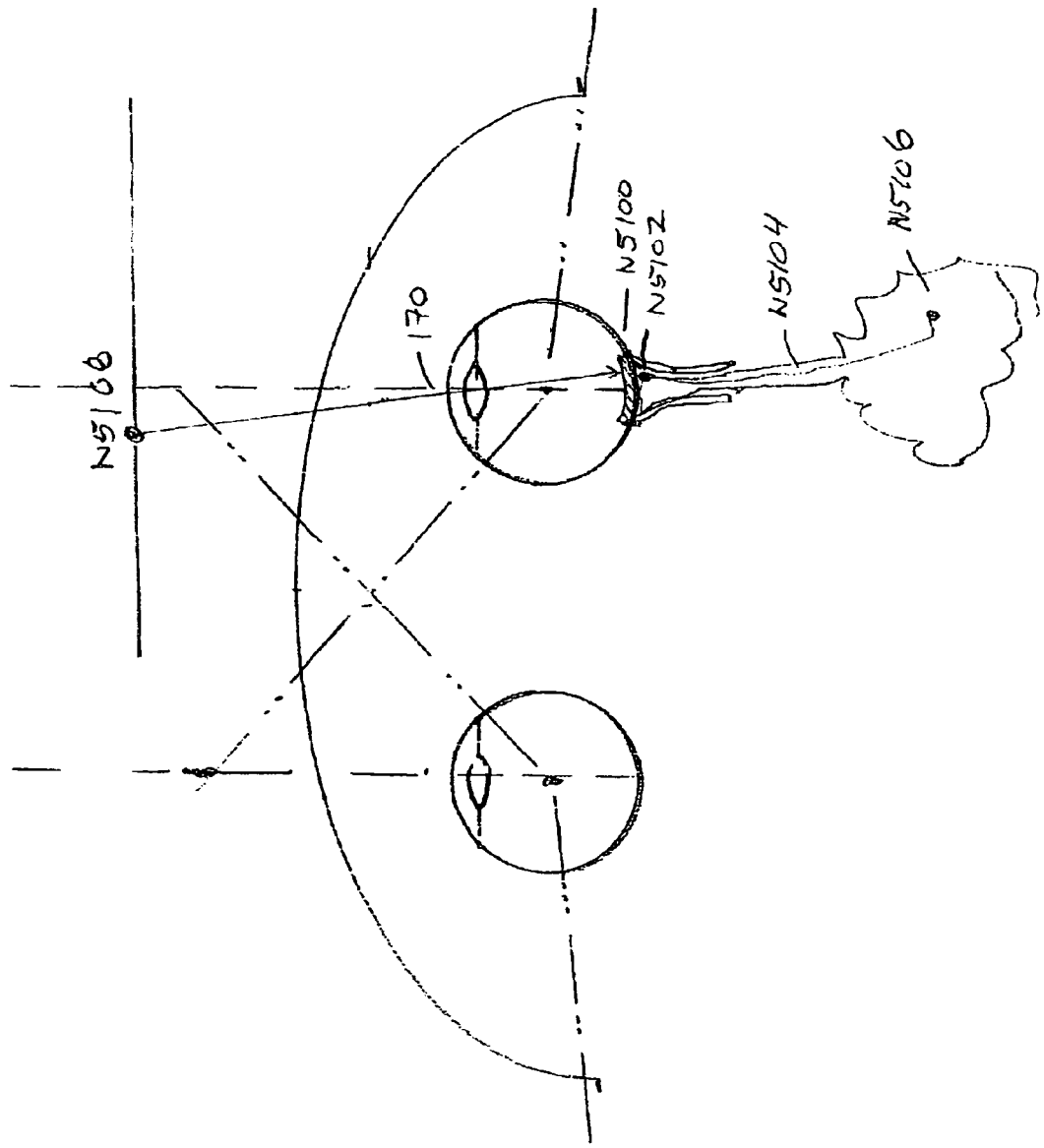

FIG. 39—Induction of Vision—The use of photonic induction of nerve transmission has been disclosed by the author in previous U.S. patent applications and papers. The preferred embodiment of the present invention discloses a method and apparatus for the direct photonic enervation of the human visual system.

It has been shown (Salzburg, 1979, this inventor and others) that the state of a neuron may be monitored optically. The reverse process is also true. The preferred embodiment incorporates the disclosed optical system in a novel way. A retinal implant N5100 receives the beam 170 which causes a localized nerve depolarization N5102 sending a signal N5104 to a brain image location N5106. The user may then identify the location in the viewer's reference (imaginary) which may or may not correspond to the virtual spatial source of the beam N5108.

The difference is received and computed by the processing computer 160 to generate a viewer's lookup table which permits a mosaic image to provide a correct view for the individual viewer's cognitive vision.

The retinal implant N5100 is the subject on the inventor's previous and pending applications and papers. The process may be used on sense, motor and aural nerves as well where processing computer 160 receives the instructions from the users biological process (Solomon, 1979) or other control systems and generates a mosaic image to activate the implant N5100.

Figure 40:
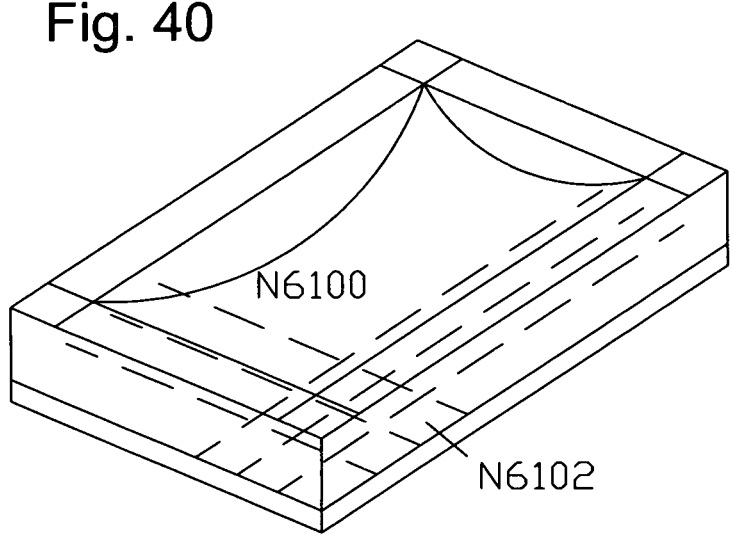
FIG. 40-44 presents a preferred deformable mirror membrane embodiment of the present invention.

FIG. 40—Variable Membrane Tension—The use of variable shape reflective and transmissive materials such as reflective membranes, transmissive liquid lenses, and materials wherein a localized change in refractive index is induced for beam forming and scanning are well known. In a preferred embodiment of the present invention these materials are utilized to vary the focal length and beam direction in a novel construction, using both integrated and multiple elements.

In FIG. 40, an elongated concave membrane N6100 with multiple electrodes N6102 is shown. The membrane N6100 is shown connected at the corners but any configuration may used. The membrane may be in tension flat or designed with a distinct neutral shape.

Figure 40A:
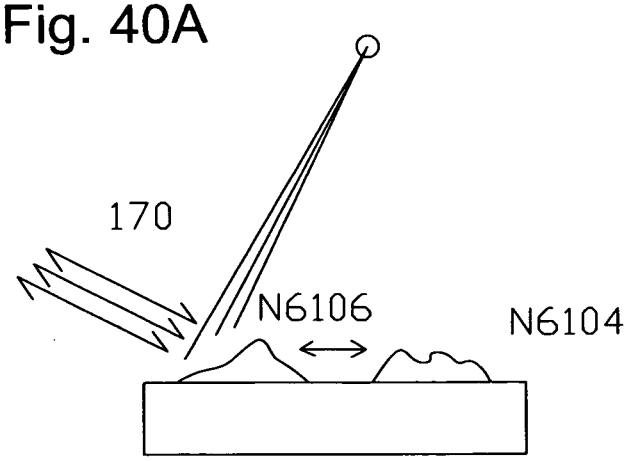

FIG. 40A shows the operation wherein a shaped portion N6104 of a convex membrane N6100 oscillates between alternative positions N6104 and N6106 during a view cycle of approximately 72 hertz. The beam 170 is reflected from the surface. During each cycle the membrane undergoes a multiplicity of subtle changes which reflect the integration of the field forces generated between the multiple electrodes N6102 and the membrane N6100. These changes are controlled by the processing computer 160 and incorporate the focal length and beam direction information.

It is understood that the membrane may represent the surface of deformable or refractive index variable transmissive material using transparent or reflective electrodes at surface N6102.

The use of deformable membrane mirrors as a method for controlling the beam direction, the focal length, the modulation of intensity and chromaticity and the correction of errors has been the subject of extensive research. In Applied Optics, Vol. 31, No. 20, Pg. 3987, a general equation for membrane deformation in electrostatic systems as a function of diameter and membrane tension is given. It is shown that deformation varies as the square of the pixel diameter [a] or voltage [V], and is inversely proportional to the tension [T]. In many applications were the invention is proximal to the human eye, increasing the pixel diameter or the voltage is impractical. Consequently, dynamic changes in membrane tension offer an acceptable method for variation. Variable membranes utilizing known mechanical, photonic, acoustic and magnetic deformation may be employed.

Figure 41:
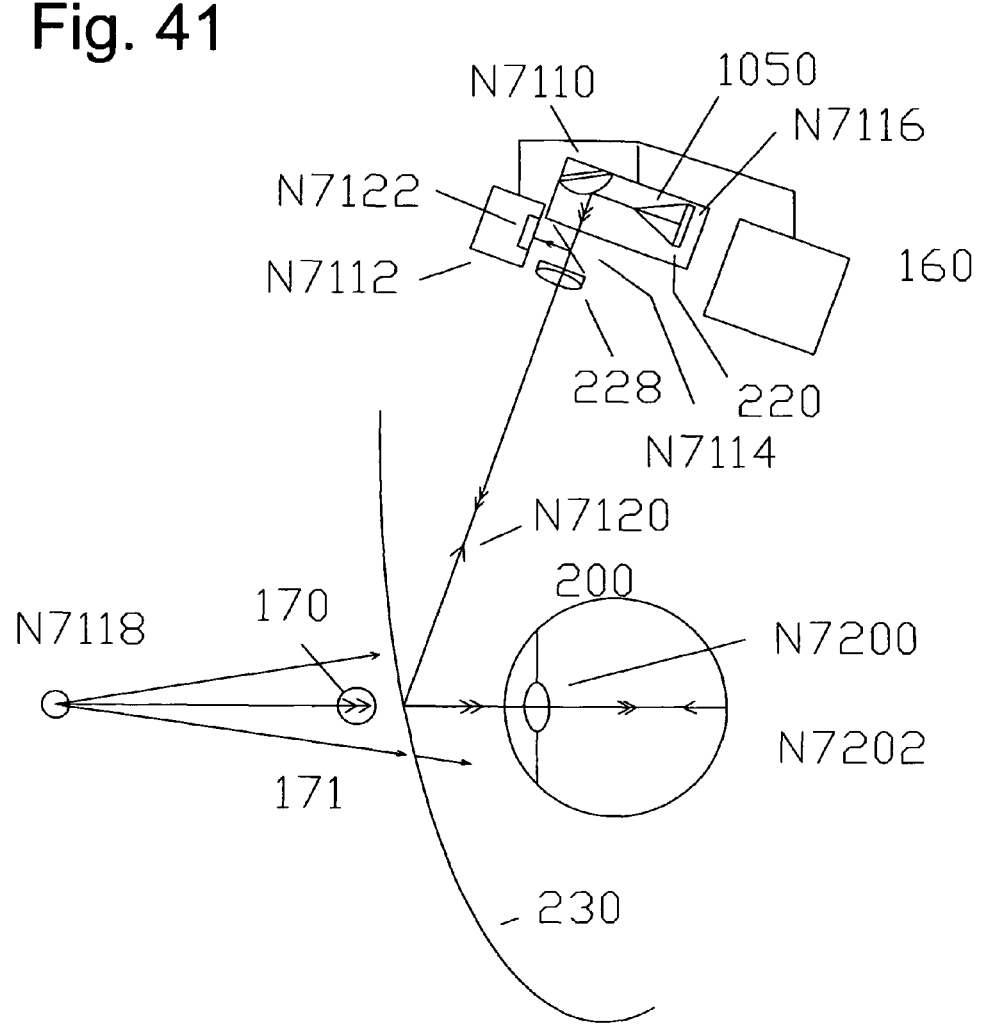

FIG. 41 shows the preferred embodiment as disclosed in related government proposals wherein the display system is comprised of a processing computer 160 which coordinates the illumination of LEEs 220, the modulation of display beam integrated translocation and focal length component N7110 and the eye state feedback component N7112. In operation, the light emitted from LEEs 220 is combined the optical waveguide 1050 and directed as a discrete beam 170 to the translocation and focal length component N7110. The beam 170 is directed and focused towards the beam splitter N7114, an optional conditioning optic 228 which may be positioned at any point between the exit aperture of the optical waveguide 1050 and the visor reflector 230, and the visor reflector 230. The beam 170 is then directed to the viewer's eye 200, presenting a replica beam of that which would have been produced by a real point N7118 on a real object 100.

Under normal illumination, a real point N7118 would generate a cone of light whose virtual representation is beams 170 and 171. The observer will perceive the object point N7118 as long image beams 170 or 171 enter the observer's iris N7200 at a viewable angle.

A reflected beam N7120 is recorded by the eye state feedback component N7112 which incorporates a detector and conditioning optic N7122 which may range from a single photodiode to a complex, hi-speed, full color camera. Data collected by the eye state component N7112 may be received and analyzed by the processing computer 160.

The preferred embodiment of the present invention may incorporate a membrane structure which dynamically and reversibly changes tension in response to applied field, charge density and photonic irradiation.

Figure 42:
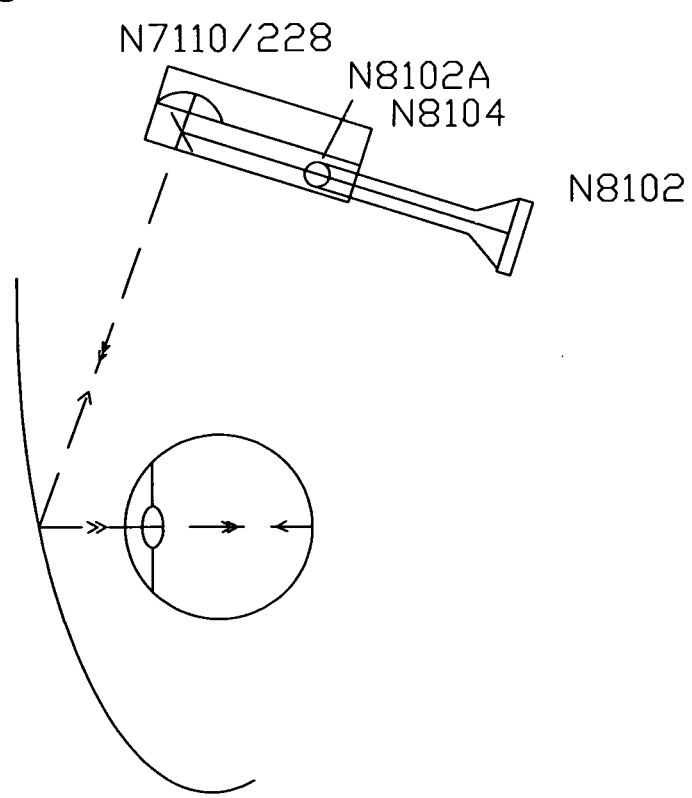

FIG. 42—Fiber optic transfer of emitter aperture—presents a preferred embodiment wherein the emitter and combiner exit aperture N8102, N8102A is transferred by means of an optical waveguide N8104 to the focal distance optical element N7110 or projection optics 228. Various shapes of waveguides including micro-optical elements may be employed.

Figure 43:
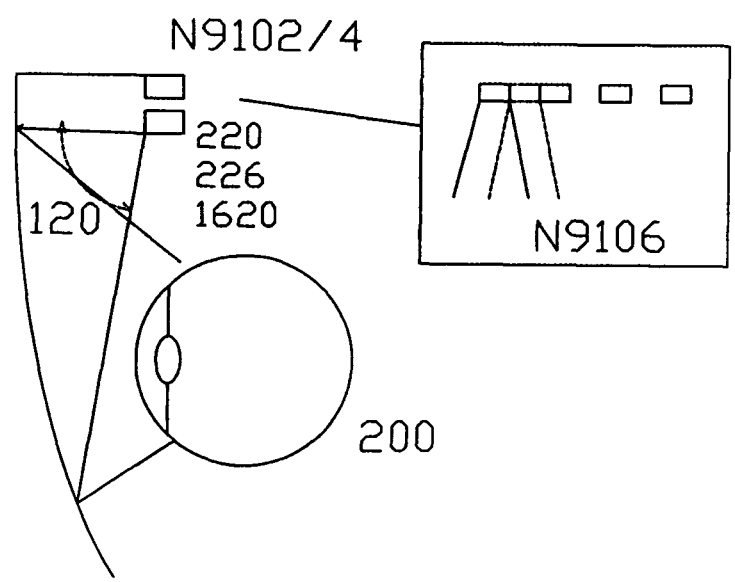

FIG. 43—Linear Construction Details (vertical scan) presents a preferred embodiment wherein the principal elements are arranged as a linear array N9102 with a vertical scan N9104. It may be understood that the present invention may be applied to alternative constructions, orientations, spacing, and shapes including but not limited to horizontal, oblique, curved or discontinuous arrays and scans.

Multiple linear LEE arrays of LEDs or FLCD shutters with tri-color LED illumination 220 with a center to center spacing of 12 microns (.mu.m) is placed perpendicular to the visor above the line of vision of the observer 200. A corresponding integrated linear scanning element array 226 and focal distance optical element 1620 with dimensions 10.times.50.mu.m, if a membrane is used is positioned adjacent to the LEE array 220. Each emitter 220 projects a solid angle having a vertical scan over the vertical field of view (approximately 120.degree.) and a horizontal projection of approximately 20.degree . . . . The resulting construction fabricated as a chip-on-board component would have dimensions of 12.mu.m times 1024 or approximately 12 mm in length by 3 mm in width.

Multiple parallel sectors N9102 may be incorporated and multiple parallel membrane modulators. N9104. Multiple sectors may be offset.

Inset on FIG. 43 shows the offset projection N9106.

Figure 44:
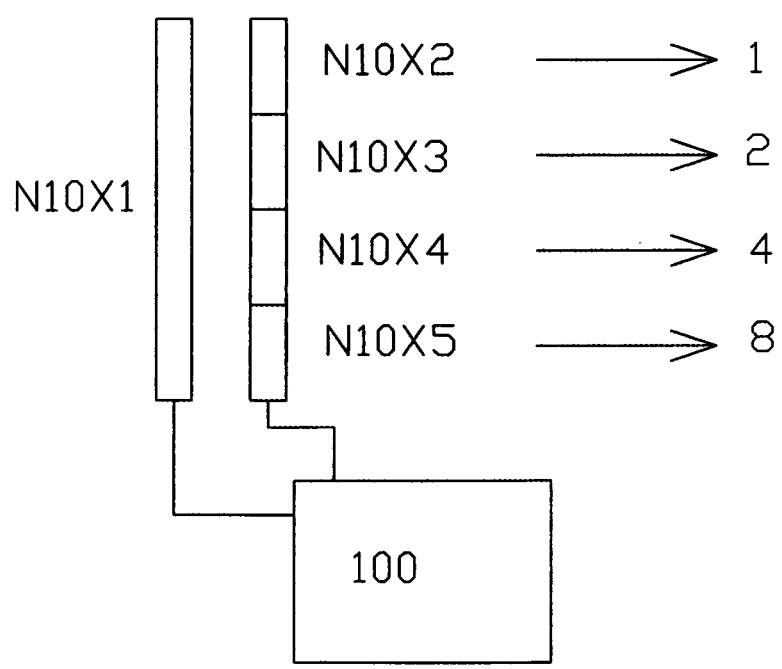

FIG. 44 presents a method for the efficient output from digital optical systems where the global intensity of the optical output may be synchronized with the digital pixel control. In previous operations, a light source N10×1 illuminates a number of digital pixel shutters N10×2–5 which are grouped together to form a single visual pixel. To achieve a value of 32, each pixel is on for the indicated number of period up to the cycle maximum of 8.

In the present invention, the intensity of the light source varies during the cycle maximum of 8 periods by the binary increments of 1, 2, 4, 8 . . . . Each pixel is illuminated for 0 to 8 periods resulting in varying intensities of 0-255 and an individual pixel density increase of a factor of 4. The base two series may be expanded to any power.

ADDITIONS: Composite linear array having:
pixel LEE driven analog
pixel LEE driven digital
group pixel LEE driven analog
group pixel LEE driven digitally
additive
binary intensity sequence
with integrated color
with distinct color
vertical scan
horizontal
with TIR visor optic
color separation
image enhancement
by F/LCD shutter
by static directed prismatic
variable ambient occlusion
forming TIR layer
with separator from TIR
integrated eye-tracker
horizontal FDOE
vertical FDOE
With TIR Screen
With FDOE enabled
With FD corrected for TIR
with dynamic HOE visor optic
HMD with image generated in ear arm and optically bent by TIR at the arm-visor junction
HMD as Personal Communicator
HMD with Dynamically Focusable Transmissive External View Lens FIG. 45 shows a preferred embodiment having a light source 10, variable focal length element 12, a first scanning element 14, a first optical element 16 and a visor optical element 18. In operation, the light source 10 is focused by focal length element 12 and scanned by scanning element 14 onto the first optic 16 and then onto the visor optical element 18. The first optical 16 causes the virtual position of the light source to displace, which is expanded by the proper complementary visor optics as viewed by the observer. This embodiment expands the visual aperture of the HMD.

Complementary optics includes various combinations of circular, parabolic, and elliptical forms. One example shown is a circular first optic 16 and an elliptic visor optic 18. Corrections for $1^{st}$ and $3^{rd}$ order aberrations may be introduced. Factors such as field of view, precision, scanning control and light source modulation may determine the optimum design for a given market.

Eye position feedback may be used to adjust the image for placement, registration with the external environment, or distortion.

Figure 46:
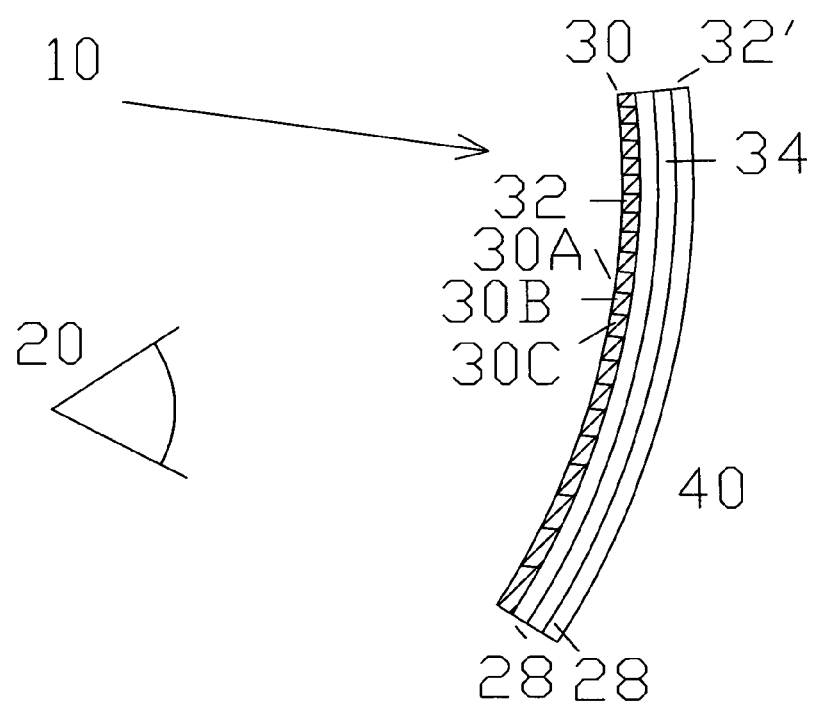

The embodiment disclosed in FIG. 46 is described in large part in my earlier and pending applications, which integrate the scanning and first optic properties by displacing the reflective surface of the scanning element 14, which may be but is not limited to a resonant mirror, from the axis of rotation. This naturally occurs with a polygon scanner.

It may be noted that the observer aperture is determined in part by the relative size of the light source aperture (pixel) and the virtual position displacement caused by the scanning optics. Thus, a wide observer aperture dictates a small light source and a larger virtual displacement.

FIG. 46 shows a preferred embodiment having an active, augmented-reality visor optics 28 having a reflective prismatic form 30, a liquid crystal medium 32 and an external substrate. In operation, the reflective forms 30a-c are sequentially switch from reflective to transmissive in coordination with the scanning of the light source 10. The ratio of reflective to transmissive periods determines the occlusion of the ambient environment. A second liquid crystal and substrate 40 may be employed to increase the occlusion of the ambient environment. The polarization optics for occlusion are not shown, but commonly understood in sequential shutter stereoglasses such as those used by IMAX or manufactured by Stereographics.

The active visor optics 28 complements and may be applied to the embodiments in my pending applications.

Figure 47:
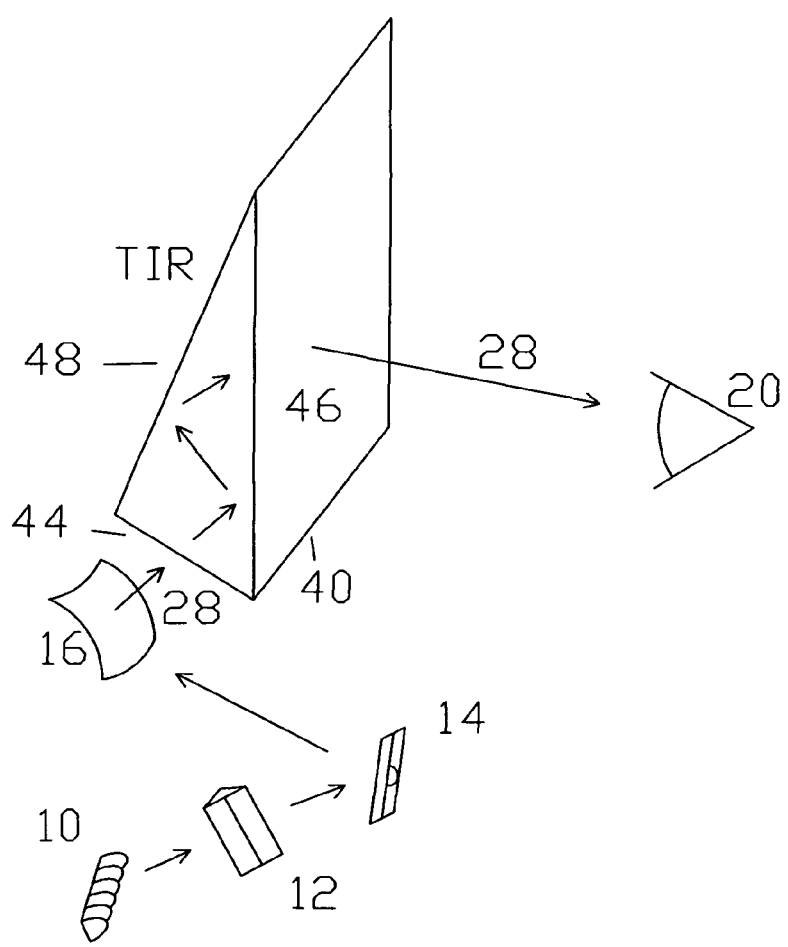

FIG. 47 shows a preferred embodiment applied to the Johnson art of total internal reflector where the beam(s) 28 from one or more light sources 10 including but not limited to a linear array are modified by a focal length element 12 and scanned by scanner 14 which may included a displacement reflector 16 into the Johnson prism 40. With the prism 40, the beam is totally internally reflected one or more times between the exit face 46 and the prism face 48, finally exiting when the intersection with the exit face 46 is more than the critical angle, to the observer 20. A redirecting optical element 60 is shown in FIG. 4 which may be diffuser, fresnel lens, micro-optic lens, HOE or other optical element depending on the use, (HMD, NTE, heads up display, screen) and position(s) of the observer(s).

Figure 48:
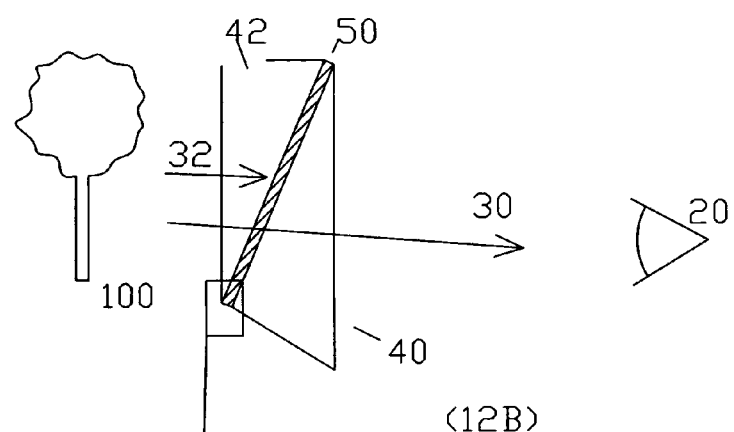

FIG. 48 shows a second prism 42 proximal but spaced from the first prism 40 which directs the light from the environment 100 through the first prism 40 to the observer(s) 20. Interposing between the prisms is a shutter system 50 (which may be but is not limited to liquid crystal shutters, electrophoretic, electro-optic, MEMS or other systems) configured and activated as rows, columns or both. In operation, the shutter acts to occlude the external environment 100 and increased the contrast of the projected ray 30. The shutter 50 may act in synchrony with the scanning system 14.

Figure 48A:
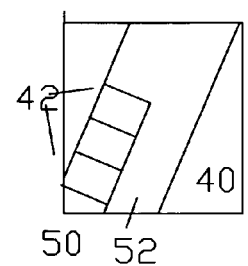

FIG. 48a shows that the shutter system 50 may be placed next to the second prism 42 with a space 52 between the shutter and the first prism 40. When used with LCD, electro-optics or acousto-optics the change in the refractive index may alter the critical angle or reflectivity, or evanescent coupling, thereby increasing resolution and contrast. Alternately, the shutter system 50 may be spaced from both prisms.

Figure 49:
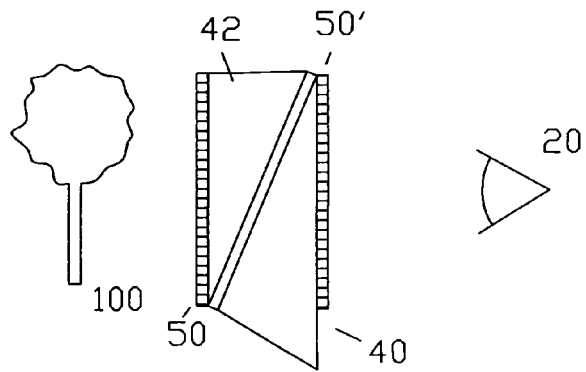

FIG. 49 shows that the shutter system 50 may be able to the observer face 50' or the environment face 50.

Figure 50:
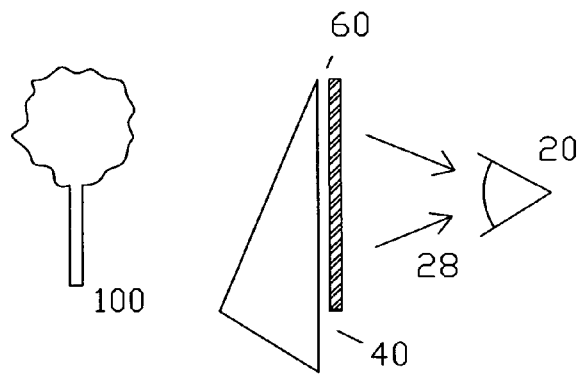

FIG. 50 shows a redirecting optical element 60 which may be diffuser, fresnel lens, micro-optic lens, HOE or other optical element depending on the use, (HMD, NTE, heads up display, screen) and position(s) of the observer(s).

Figure 51:
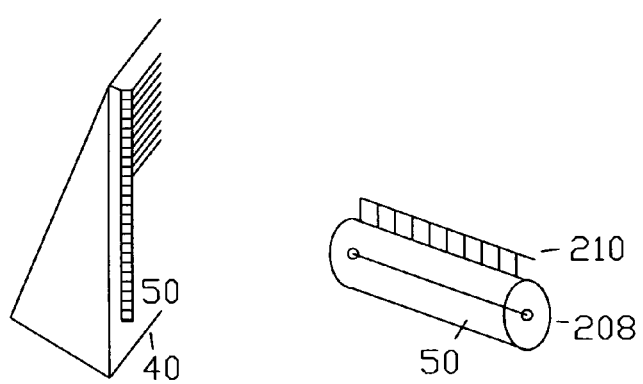

FIG. 51 shows a method of manufacturing the linear array shutter system where the shutter material (LCD, for example) 50 is applied to a film which is placed on roll 208 and serially sliced 210 (etched by laser, for example.)

Figure 52:
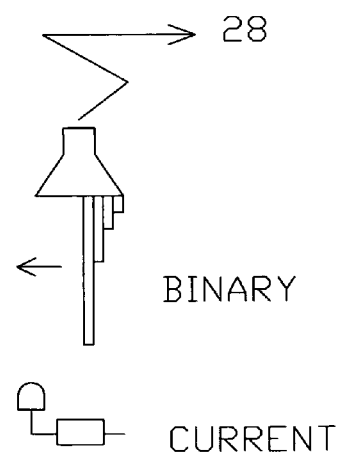

FIG. 52a shows a binary intensity array of light sources which when energized simultaneously may produces wide intensity range.

FIG. 52b shows a current control system for the light sources which when energized simultaneously may produces wide intensity range.

Figure 53:
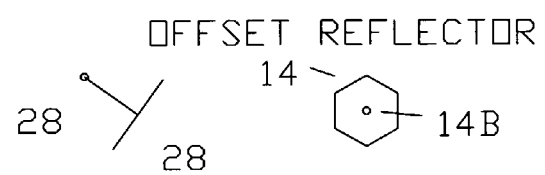

FIG. 53 shows the offset embodiment for the scanner.

Figure 54:
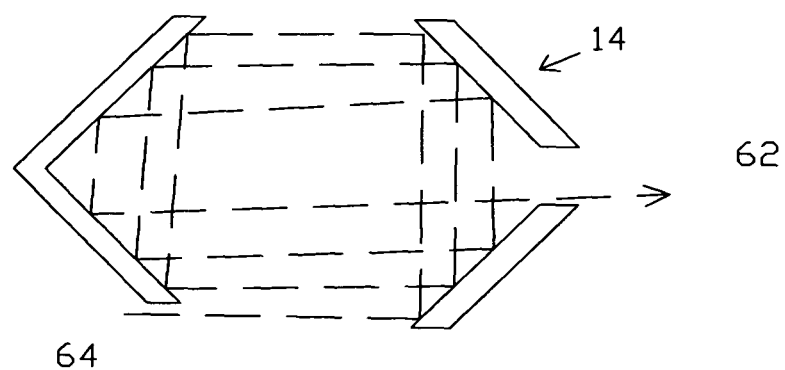

FIG. 54 shows a variable distance, folded optics where the light source is reflected by scanner 14 to the entrance aperture 64 and internally reflected by slight skewed right reflectors/prisms 14', 14" and output at exit aperture 62.

Figure 55:
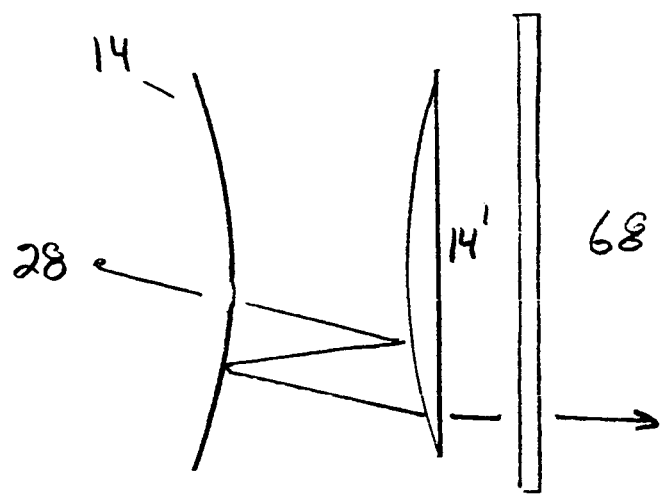

FIG. 55 shows the right reflector 14', 14" may be curved to produce a broaden image 68 from the input image 28.

Figure 56:
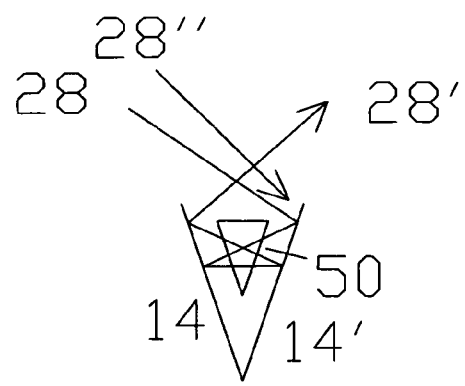

FIG. 56 shows a solid-state scanner having reflective faces 14, 14' and a LC (liquid crystal, or other transparent refractive index modulator) core 50. The input beam 28 traverses the core 50, reflects from surfaces 14, 14' and exit as beam 28' or 28". The number of reflections and the exit angle is varied by changing the refractive index of the core 50.

Figure 56A:
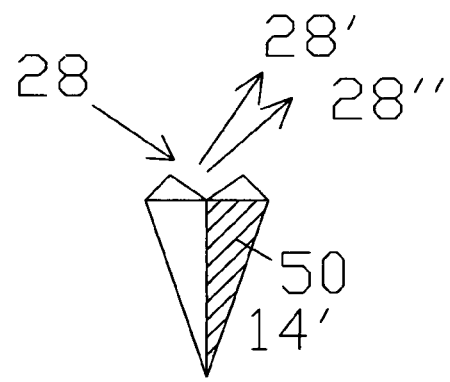

FIG. 56A shows an alternative solid-state scanner where the LC region 50 is proximal to one reflective face 14'.

Figure 57:
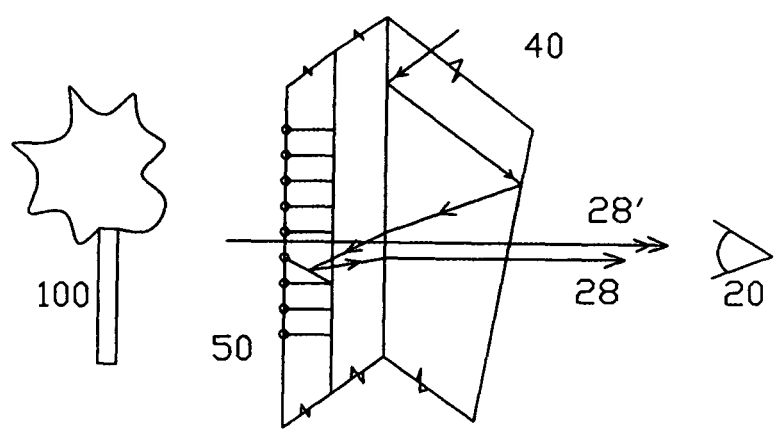

FIG. 57 present an active shutter reflector element 50' which may function as the redirecting optics 1350 as shown in FIG. 13 and FIG. 50, one or more shutter systems 50, 50' may be incorporated with a redirecting optic 60 placed before or after. When the shutter system 50' is in between the observer the prism exit face 46 it may additionally function to increase the resolution, shown as vertical lines but not limited to any direction, of the beam by masking the adjacent regions 50a, b, c, when opened in synchrony with the scan. The scans may be interlaced (alternating patterns).

Figure 58:
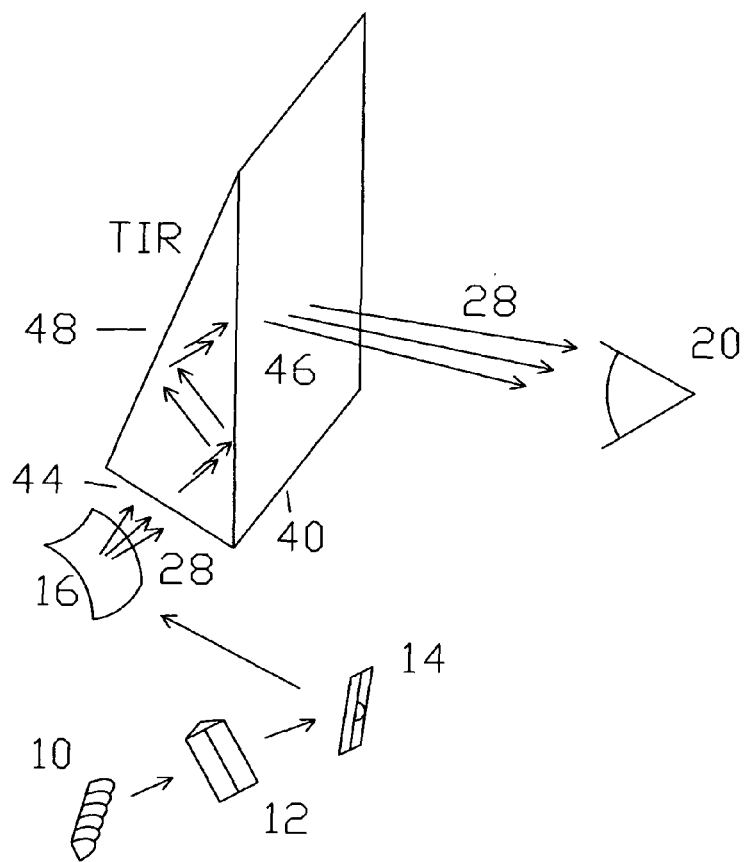

FIG. 58 present a linear accommodation embodiment where the LEE array 10 projects a fan shaped beam 28,28', 28'" from each pixel. When the fan beam 28 is perpendicular to the wedge axis of TIR prism 40, the optical path lengths are symmetrical about the principal axis of the beam 28 and facilitate visual accommodation. Further the necessary optics are simplified and the resolution of the system improved.

Chromatic control may be integrated or distinct, with separate LEEs for each color. While RGB combinations are well-known, additional colors including yellow, amber and purple may be included.

Accurate accommodation requires the adjustment of the base level for objects in the system. Thus an virtual object designed to by at 1 meter will require focal distance adjustment as it moves from the along the wedge axis. A LUT may be provided in the software to introduce the correction.

The shutter element 50 may be optically-active materials such as liquid crystal, (LC, FLC), dyes, or displaceable elements such as micro-mirrors, electrophoretic spheres, piezo-vanes, etc. While the embodiment shown places the LEE and prism vertically, the orientation may be horizontal or oblique. The TIR pathway may begin in the ear arm of a pair of eyeglasses and bend around the corner. The visor, LEE and other components may be curved or conform to a unique shape.

Figure 59:
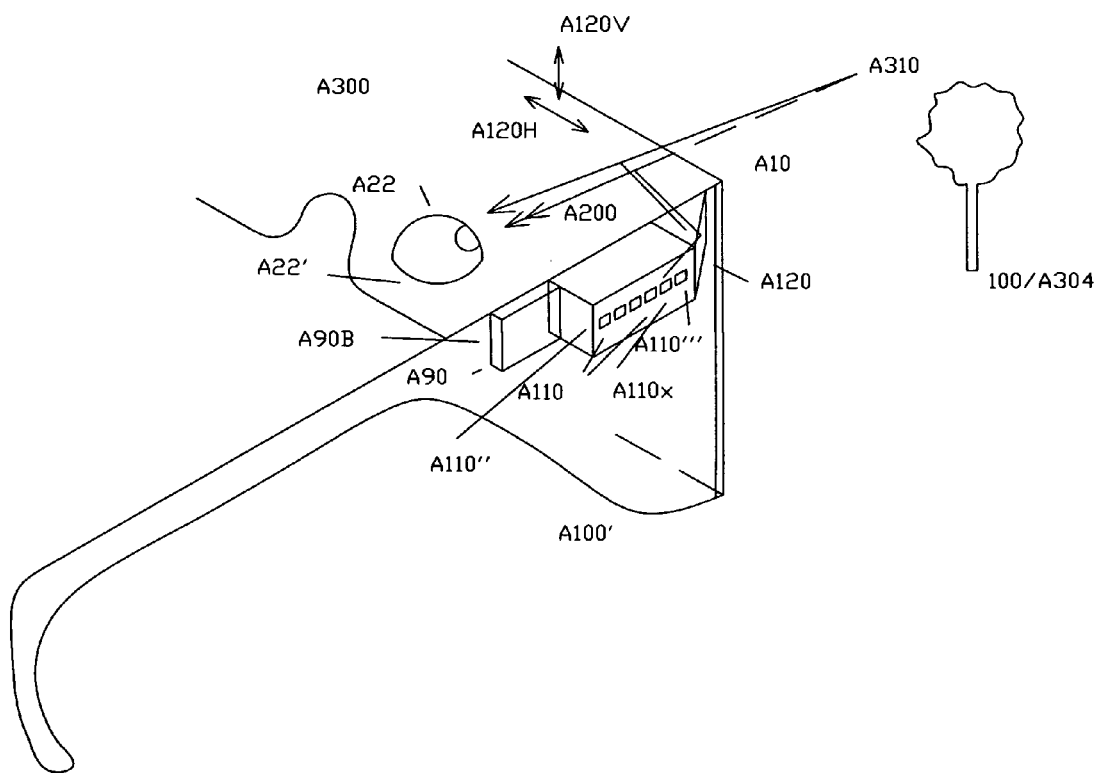
FIG. 59-60 presents a preferred augmented display embodiment of the present invention

FIG. 59 shows a perspective view of the combined system A10 having a light emitting element (LEE) array A110, scanning optics A120 in the form of a two-axis, reflective scanner, and a partially reflective, micro-optical element visor or screen A300. The LEE array A110 and scanning optics A120 are controlled by computer assembly A90. Common to all head mounted displays and well known to those skilled in the art are a power source such as a battery A90B and a data receiving channel such as a television broadcast decoder or other data link. These are usually incorporated in the computer assembly A90 and therefore not shown separately.

In operation, the light beams A200, A200' (shown by single and double arrows respectively) from one of the LEE array elements A110x are cyclically scanned by the two-axis (vertical A120v and horizontal A120h), reflective scanner A120 across the partial reflective visor A300. The reflected beams A200, A200' directed towards the observer's eye A22 which, when in focus converge as a single point on the retina A22'. As is common in augmented reality systems, the partial reflective screen A300 also permits the observer to view the external environment A304. The percentage of reflectivity is commonly controllable by a number of well-known technologies including but not limited to LDC shutters. By scanning the entire screen at 30 frames per second, a stable, full virtual image A310 over a wide field of view is presented.

To the observer, the apparent distance between oneself and a light emitting element A110' is a function of the design focal length of the system which includes the focal lengths incorporated in the visor A300, the scanner A120, and the LEE array A110. Commonly, HMDs are set at about 12 feet. In a preferred embodiment of the present invention, the LEE array A110 is co-axial with the principal optical axis of the system and along this axis, the distal LEE element A110" is further away than the proximal LEE element A110'". As a result, the LEE elements A110 will each focus at a different virtual distance A310, and they may be simultaneously illuminated.

In my earlier inventions disclosed in U.S. patent application Ser. No. 07/779,066 and subsequent applications, co-axial image points could only be presented sequentially in time. One of the significant advantages of the present invention is that a multiplicity of co-axially elements may be simultaneously illuminated. In defense, medical and other applications where multiple targets frequently align co-axially, the present invention increases image comprehension and accuracy while improving the reaction time.

Figure 60:
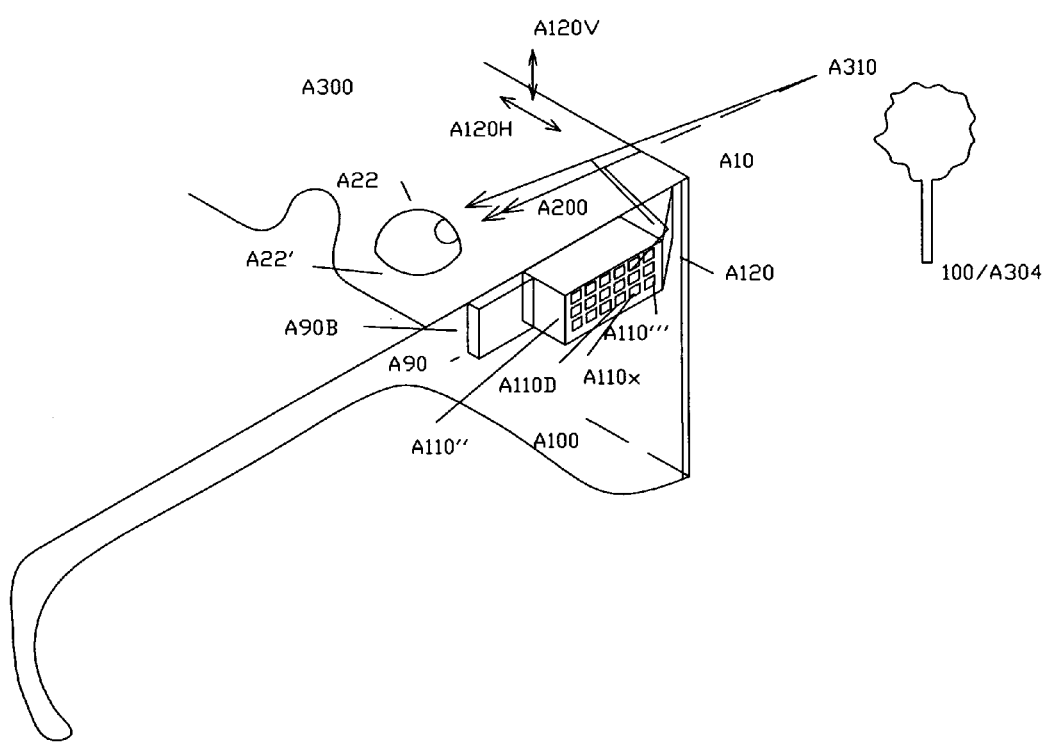

FIG. 60 shows the present invention with a two-dimensional (7×3), light emitting element array A110D. It may be understood that the size of the array is generally 4096×1024 and the virtual image 640-4096×1024. Two advantages of this preferred embodiment are the simplification of the scanner A120 from two-axis to one A120H, and reduction in the required frequency of illumination of the individual light emitting elements A110 for a given image resolution. While FIG. X2 shows the placement of the light source and scanning assembly A100 on the side of the head, any placement may be employed including but not limited to on the top or bottom of the head, on the cockpit dashboard, or a desktop.

Displays with visual accommodation produce an image by scanning a divergent beam from each image pixel directly into the field of view of the observer rather than forming a real image on a screen or surface, though embodiments may not implement the attribute. In the natural environment, the divergent beam is generally circular orthogonal to the principal axis between the center of the observer's eyelens and the originating image pixel. However, under certain natural and normal circumstances, including the polarized reflections from the surface of a body of water, beam may be elliptical or linear. Nonetheless, human visual accommodation is able to respond accurately.

A number of display configurations and technologies including those enabling visual accommodation may be enhanced, both in performance and manufacturability, by projecting a linear form of the divergent beam.

In my earlier patent applications including Ser. No. 07/799, 066, I disclosed improvements to the well-known waveguide wedge taught in U.S. Pat. No. 4,212,048 by Donald Castleberry and U.S. Pat. No. 4,109,263 by Bruce Johnson of the Polaroid Corporation of Cambridge, Mass. Mr. Johnson was a co-employee of my colleague at MIT and Woods Hole, and his total internal reflection camera was often used as a visual display screen with a ground glass focusing element in place of the film. Both natural and projected images were used. My referenced enhancements have also been the subject of discussions with collaborators at MIT Professors Stephen Benton and Cardinal Ward.

During an active experimental period with Prof. Cardinal Warde in the 1990s, and subsequently in conjunction with a U.S. Department of Defense project from 2001 through 2003, the prior known art related to total internal reflection and beam extraction technologies was explored for a multiplicity of purposes. These technologies included those described in U.S. Pat. No. 5,920,622 of Hinkov, U.S. Pat. No. 5,768,010 of Iwamoto, and U.S. Pat. No. 4,776,661 of Handa. The use of guided travelling wave electro and acousto-optic diffraction discussed by C. S Tsai Appl. Phys. Lett. 70, 3185 (1997) and applied to a surface of the TIR or optical waveguide were also considered.

While the application of the Johnson Wedge was well-known at MIT, it application was limited to the compactness of the optical path in connection with reprojection of the image from an often diffusive screen in the Johnson film plane. This is in part due the substantial different optical path lengths and visual focal distance between the display exit pixels at the base and tip of the wedge.

This preferred embodiment of the present invention addresses the application of the Johnson Wedge to devices which maintain the optical focal distance to the LEE.

Figure 61:
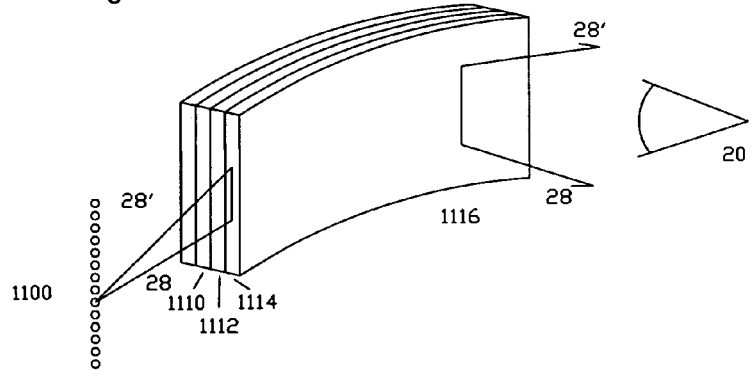
FIGS. 61-62 present a preferred augmented display embodiment of the present invention having a thin film transmission.

FIG. 61 presents the thin-film preferred embodiment of the present invention having a generally linear pixel source 1100, a thin-film waveguide 1112, an extraction/activation layer 1114, an augmented occlusion layer 1110. In direct transmission operation, the vertically divergent beams 28, 28' are emitted by the pixel source 1100 and coupled to the thin-film waveguide 1112 in which they travel by total internal reflection or evanescent wave exiting at proper exit position 1116 along the waveguide 1112 and directed to the observer's eye 20. The visual accommodation faculty of human vision will adjust the focal distance of the observer's eye in response to the vertical divergence of the beams, obviating the need for a horizontal divergence which would demand a more complex optical waveguide for high resolution transmission.

The extraction/activation layer 1114 and thin film layer may be active or passive, reversed and function by direct or reflected extraction/activation. As an active extraction layer 1114 the construction may included but is not limited to an array of liquid crystal (LC, FLC) vertical linear apertures timed with the transmission, wavelength conversion using quantum dots, two photon conversion, embedded conversion elements, coupling evanescent waves, optical coherence tuning and other known optical technologies.

In addition as a passive extraction/activation layer, the construction may be of multiple planar layers with a thickness approaching evanescent wave dimensions and terminating or transitioning at a fixed distance. A 2000 layer system comprised of a transmission and spacing sub-layers may be less than 2 millimeters (1 micron thick layers) in thickness.

Figure 62:
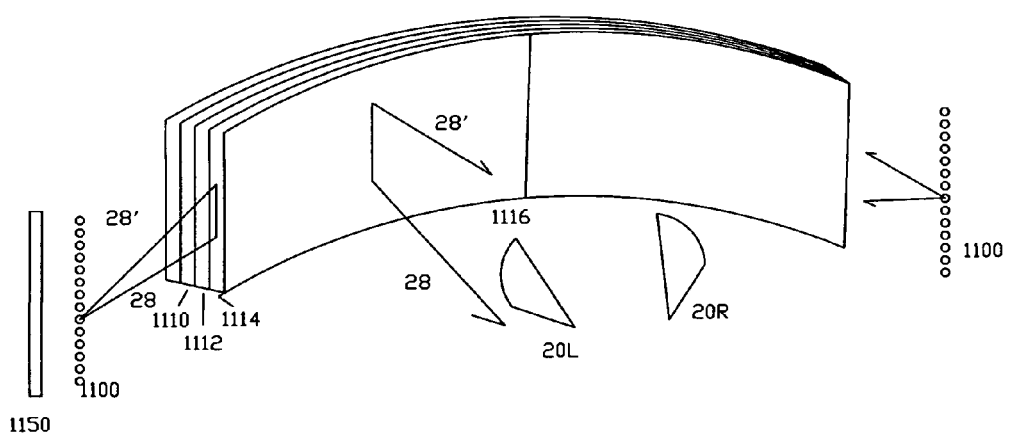

FIG. 62 presents one of many locations for an integrated camera element 1150 which records the position, orientation, iris, and focal length of the observer's eye from the reflected beam—which may be the image forming beam or an auxiliary beam including but not limited to a non-visible wavelength such infrared or ultraviolet.

Figure 63:
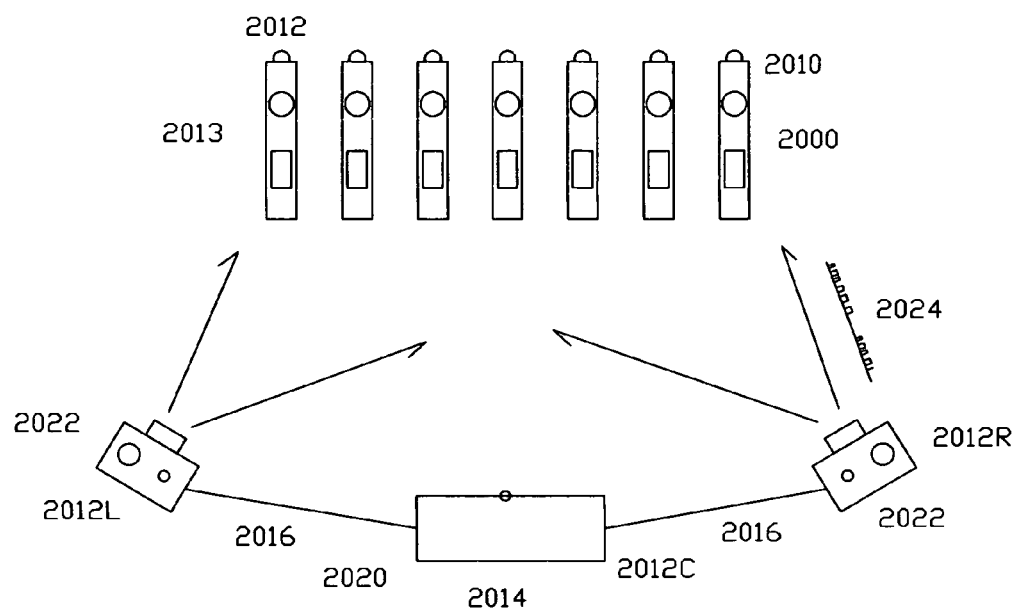
FIGS. 63-65 present a preferred integrated augmented special effects display having movable elements

FIG. 63 presents an integrated visual display system which may be applied broadly to my related inventions having one or more fixed, movable, independent, handheld, suspended, and/or otherwise located device 2000, one, two or three dimensional visual emitters 2010, a wireless communications element 2012R, and a special effects module 2013 which may include audio, tactile, inertial, olfactory, or other effects, controlled by RF, acoustic or photonic devices 2012 from a control board or computer 2014.

In operation using infrared communication, the photonic control devices 2012 may be static or moving sources and spots having static, mechanically, optically or electronically patterns including but not limited to omnidirectional sources, regional fixed IR spotlights, moving gobo patterned spots, digital micro-mirrored device (DMD) electromechanically controlled patterning, LCD or other electronic patterning device. Multiple overlapping control devices 2012L, 2012C, 2012R may be used to provide full data signal coverage, and the specific patterns may be adjusted to present a single seamless data pattern of controlled intensity including but not limited to the methods employed with visible light projectors.

In operation, a carrier frequency 2024 such as 38 Khz, or 450 KHz may be imposed under the data signal. When multiple control devices 2012 are employed the carrier frequency may be synchronized electronically or optically, including by a wireless master carrier frequency synch signal 2020 and corresponding receivers 2022.

Figure 64:
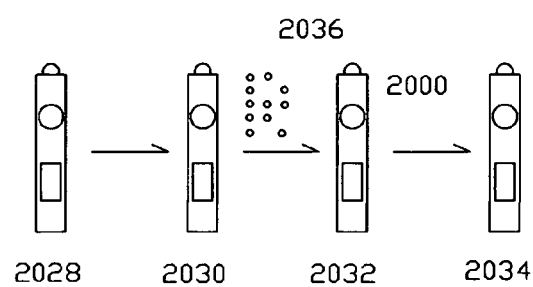

FIG. 64 presents a moving device 2000 having an embedded pattern 2036 which may be pre-coded or transmitted, and which displays upon receiving a sequence of activating signal at location 2028, 2030, 2032, 2034. A history of the device 2000 locations may be stored and used to adjust the proper timing and direction of the displayed pattern 2036.

Figure 65:
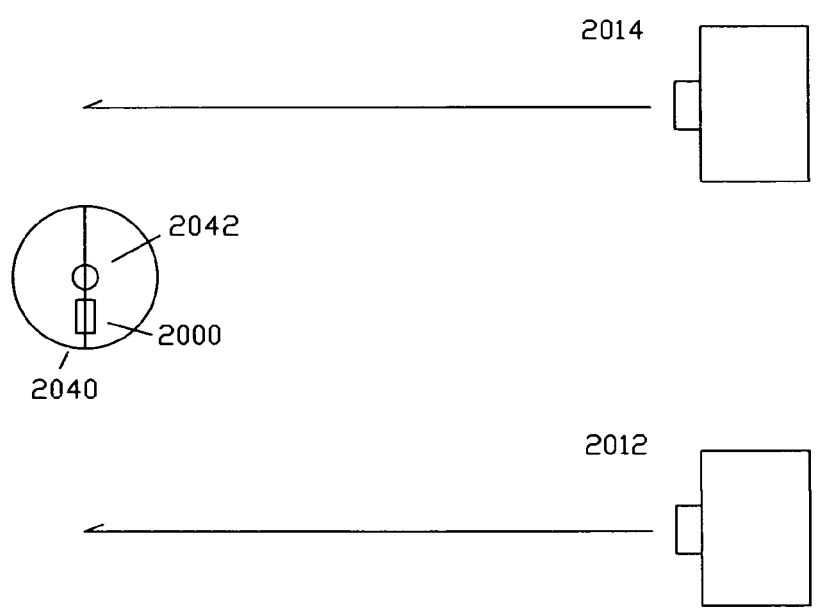

FIG. 65 presents a balloon embodiment of the moving device 200 having an additional special effect altitude control 2042 including but not limited to a volume heater/cooler, volume pump, balloon surface tension material, chemical reaction or other known device to regulate the volume or buoyancy of a balloon. A bistable wire web may be employed to alternatively contract and expand the volume.

In operation, an upper 2014 and lower signal 2012 may be provided to regulate to the altitude to a given layer. Alternatively, the signal strength may be employed to cause the balloon to descend once it reaches a defined level or is lost.

Figure 66:
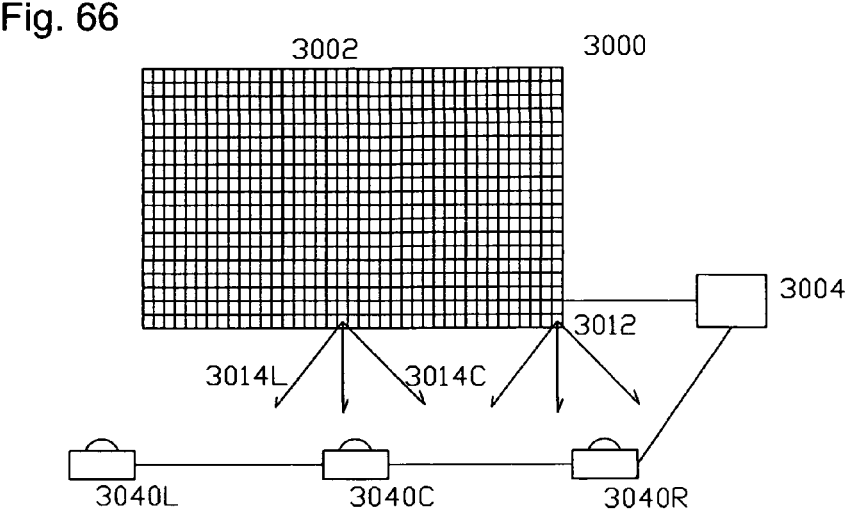
FIGS. 66-69 present a preferred integrated augmented display having a beam holographic environment

FIG. 66 presents an improved beam holographic background display 3000 background having one or more digital beam holographic pixels 3012 which emit a complex pattern of light, horizontal and/or vertically, replicative of a virtual visual screen through which one views a 2 or 3-dimensional image of design. Details of the principles of operation have been presented in my earlier related applications. The improved display may be constructed by one or more columns 3002 of pixels, each column 3002 derived from the projection of one or more projection spatial light modulators (SLM) 3010. An SLM 3010 having a base resolution of 1024× 768 may be expanded into a column of 768 pixels and 1024 horizontal views 3014'.

The column beam presentation 3014L at a given angle may be monitored by a sensor or camera 3040L and an appropriate correction may be applied by the internal controller or a central server 3004. The beam presentation may be an non-visible wavelength such as but not limited to infrared. If a number of the peripheral views of the SLM are reserved for correction, the system will be able to dynamically correct for substantial vibration, displacement or other interruptions. The percentage required is dependent on the conditions such that a fixed stable system may require only 4-6 pixel views while a mobile stage mounted system for outdoor shows may require 20-40 views.

Multiple sensors 3040L, 3040C, 3040R may be employed to increase the accuracy.

Figure 67A:
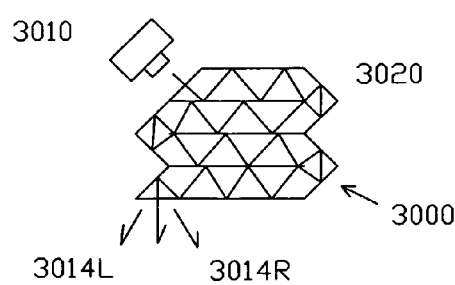

FIG. 67A presents top view of a total-internal reflection differential expansion of the projected pattern of the SLM 3010 through a series of waveguides 3020.

Figure 67B:
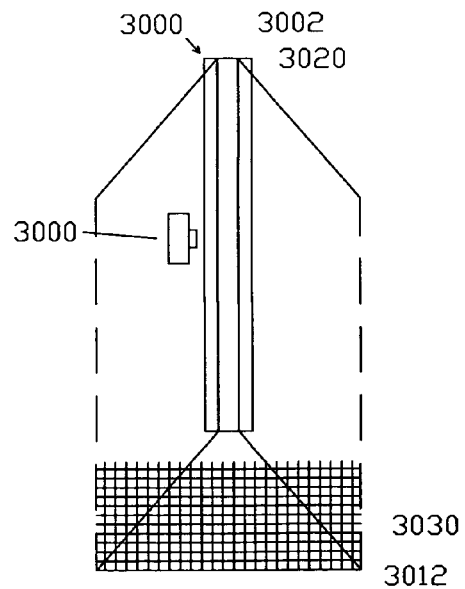

FIG. 67B presents a perspective view having the SLM 3020 centrally mounted proximal to the column 3002 and the projection grid 3030 shown.

Figure 68:
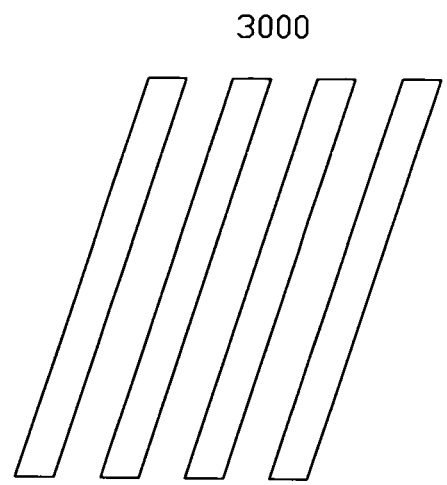

FIG. 68 presents the columns angled.

Figure 69:
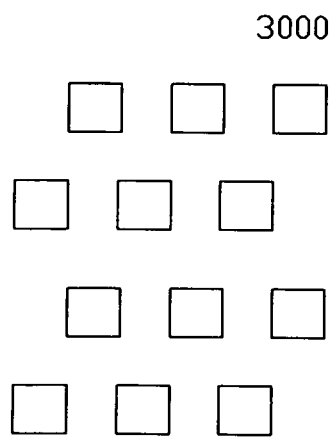

FIG. 69 presents the columns staggered and in parts.

As shown in FIG. 1, an integrated, coordinated display system may be created having a dynamic, three dimensional beam holographic background 3000, a visual space filled with moving pixel devices 2000, and an augment observer mounted display system The embodiment of the invention particularly disclosed and described herein above is presented merely as an example of the invention. While the present invention is presented in a binocular environment, the novel elements may be applied to monoscopic or polyscopic devices, head mounted, near to eye, immersive, planar, television and cinema configurations. Other embodiments, forms and modifications of the invention coming within the proper scope and spirit of the appended claims will, of course, readily suggest themselves to those skilled in the art.

The invention claimed is:

1. A visual display system having pixel-specific, visual accommodation comprising:

light-emitting element array means for projecting one or more parts of a full image wherein the surface of said array is not optically orthogonal with the principal optical z-axis of the visual display system and wherein each pixel of said array is positioned at a fixed optical focal distance from the observer;

optical scanning means for displacing the optical radiation from said light emitting elements array means across the x-y plane of the field of view;

optical screen means for projecting the optical radiation from the light emitting elements means toward the observer's eye preserving the optical focal distance of said light emitting elements;

computational means for calculating, controlling and synchronizing the illumination of said light emitting element array with said optical scanning means and said optical screen means to project to create a full image with pixel-specific visual accommodation to the observer.

2. A visual display system in accordance with claim 1 wherein said optical screen means is at least partially transparent during the visual-integration period enabling the observer to view the ambient environment.

3. A visual display system in accordance with claim 1 wherein at least one optical component conforms the observer's depth of focus of said light-emitting array to an extended range within the limits of human vision from infinity to macroscopic.

4. A visual display system in accordance with claim 1 wherein the optical radiation from said light-emitting array is projected to the observer's eye by total internal reflection optics.

5. A visual display system in accordance with claim 1 wherein said optical screen means interposes binocular images having an intersecting eye-related convergence points.

6. A visual display system in accordance with claim 1 wherein said light-emitting array means includes an at least partially transparent light-emitting medium having means to activate a defined region of said medium.

7. A visual display system in accordance with claim 1 further comprising at least one eye state and position monitoring means providing said controller means data including intraocular distance, eye lens aberrations, focus, direction and iris dilation to conform the modulation of said light array means and display means to the observer's eye state for optimum performance.

8. A visual display system in accordance with claim 7 wherein said eye monitoring means is integrated into the same optical path as said light-emitting element means.

9. A visual display system in accordance with claim 1, wherein said optical screen means is comprised of at least one thin-film optical conduit means which retains the defined optical focal distance in at least one-dimension.

10. A visual display system in accordance with claim 9, wherein said optical conduit means is integrated with an extraction-activation means enabling the radiation transmitted through said conduit means to exit said conduit means at a defined position and with a defined angular distribution and wavelength.

11. A visual display system with varying pixel-specific visual accommodation in accordance with claim 10 wherein said extraction-activation means incorporates a means to temporarily alter the refractive index of said thin-film waveguide.

12. A visual display system with varying pixel-specific visual accommodation in accordance with claim 10 wherein said extraction-activation means incorporates a means to temporarily alter the reflectivity of one surface of said thin-film waveguide.

13. A visual display system in accordance with claim 1, wherein said optical screen means is comprised of at least one total internal reflection optical conduit means which retains the defined optical focal distance in at least one-dimension.

14. A visual display system in accordance with claim 1, further comprising at least one sensor means to register, monitor and correct the registration and performance of the visual system.

15. A visual display system in accordance with claim 14, wherein said sensor means is a digital camera.

16. A visual display system in accordance with claim 1, further comprising a transparent light-emitting volume having the width of one exit aperture of the x-y axes a single pixel wherein the position and illumination of pixels within said transparent volume is activated by the external application of directed energy.

17. A visual display system with varying pixel-specific visual accommodation further comprising:

at least one linear array of at least two light-emitting elements;

at least one array element, optical focal length varying means for each light-emitting element;

an array optical scanning means in a direction perpendicular to the axis of said linear array means, and at least one thin-film, optical waveguide screen means wherein the optical radiation output from said light-emitting element array means maintains the proscribed optical focal length from the focal length varying means to the observer's eye in at least one dimension.

18. A visual display system in accordance with claim 17 wherein said optical conduit means is integrated with an extraction-activation means enabling the radiation transmitted through said conduit means to exit said conduit means at a defined position and with a defined angular distribution and wavelength.

19. A visual display system with varying pixel-specific visual accommodation in accordance with claim 18 wherein said extraction-activation means incorporates a means to temporarily alter the refractive index of said thin-film waveguide.

* * * * *